(12) United States Patent
Singh et al.

(10) Patent No.: US 10,208,076 B2
(45) Date of Patent: *Feb. 19, 2019

(54) RENEWABLE AROMATICS FROM LIGNOCELLULOSIC LIGNIN

(71) Applicant: National Technology & Engineering Solutions of Sandia, LLC, Albuquerque, NM (US)

(72) Inventors: Seema Singh, Fremont, CA (US); Patanjali Varanasi, Fremont, CA (US); Blake Simmons, San Francisco, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/757,851

(22) Filed: Dec. 23, 2015

(65) Prior Publication Data

US 2016/0122379 A1 May 5, 2016

Related U.S. Application Data

(63) Continuation-in-part of application No. 14/650,506, filed as application No. PCT/US2013/073936 on Dec. 9, 2013.

(60) Provisional application No. 61/734,898, filed on Dec. 7, 2012, provisional application No. 62/096,467, filed on Dec. 23, 2014.

(51) Int. Cl.
    *C07G 1/00* (2011.01)
    *D21C 3/20* (2006.01)
    *D21C 11/00* (2006.01)

(52) U.S. Cl.
    CPC .................. *C07G 1/00* (2013.01); *D21C 3/20* (2013.01); *D21C 11/0007* (2013.01)

(58) Field of Classification Search
    CPC ......... C07G 1/00; D21C 3/20; D21C 11/0007
    See application file for complete search history.

(56) References Cited

U.S. PATENT DOCUMENTS

| | | | |
|---|---|---|---|
| 2007/0215300 A1 | 9/2007 | Upfal | |
| 2008/0227162 A1* | 9/2008 | Varanasi | C12P 7/10 435/96 |
| 2010/0163018 A1 | 7/2010 | Gifford | |
| 2010/0196967 A1* | 8/2010 | Edye | C12P 7/10 435/105 |
| 2010/0279372 A1* | 11/2010 | Cho | C08H 8/00 435/165 |
| 2010/0319862 A1* | 12/2010 | Rahman | D21C 3/20 162/50 |
| 2011/0201096 A1* | 8/2011 | Streffer | C08H 8/00 435/277 |
| 2011/0225878 A1* | 9/2011 | Moulijn | C10G 1/04 44/388 |
| 2012/0178921 A1* | 7/2012 | O'Connor | C08H 8/00 536/56 |
| 2013/0252285 A1* | 9/2013 | Blanch | C08B 1/003 435/99 |
| 2013/0292331 A1* | 11/2013 | Lipscomb | B01D 61/58 210/640 |
| 2013/0302854 A1* | 11/2013 | Tabata | C13K 1/02 435/72 |
| 2014/0273104 A1* | 9/2014 | Paripati | C12P 19/14 435/99 |
| 2014/0309416 A1* | 10/2014 | Teixeira | C08H 8/00 536/127 |
| 2014/0326421 A1* | 11/2014 | Fallon | D21C 3/20 162/14 |
| 2015/0094459 A1* | 4/2015 | Kroon | C08H 8/00 530/507 |
| 2015/0122246 A1* | 5/2015 | Sun | C13K 1/02 127/37 |
| 2015/0322214 A1 | 11/2015 | Singh | |
| 2016/0122379 A1* | 5/2016 | Singh | C07G 1/00 530/507 |

FOREIGN PATENT DOCUMENTS

CN        102492154 A     6/2012

OTHER PUBLICATIONS

Dibble et al. Green Chem. 2011, 13, 3255-3264.*
Li et al. (Ind. Eng. Chem. Res. 2010, 49, 3126-3136) (Year: 2010).*
Honglu et al. (Holzforschung, vol. 60, pp. 509-512, 2006) (Year: 2006).*
Creighton et al., "Aromatic Aldehydes from Spruce and Maple Woods," J Am. Chem. Soc., 63(1):312 (1941).
Dibble et al., "A facile method for the recovery of ionic liquid and lignin from biomass pretreatment," Green Chem., 13: 3255-3264 (2011).
Li et al., "Extraction of Lignin from Sugar Cane Bagasse and its Modification into a High Performance Dispersant for Pesticide Formulations," J. Brazilian Chem. Soc., 22(10):1866-1871 (2011).
Sun et al., "Complete Dissolution and Partial Delignification of Wood in the Ionic Liquid 1-ethyl-3-methylimidazolium acetate," Green Chemistry 11:646-655 (2009).
Tan et al., "Extraction of Lignin from Lignocellulose at Atmospheric Pressure Using Alkylbenzenesulfonate Ionic Liquid," Green Chemistry 11(3):339-345 (2009).
Varanasi et al., "Survey of Renewable Chemicals Produced from Lignocellulosic Biomass during Ionic Liquid Pretreatment," Biotechnol Biofuels 6(1):14, Jan. 28, 2013.
Xin et al., "Extraction of Lignins from Aqueous-Ionic Liquid Mixtures by Organic Solvents," Biotechnol Bioeng, 109(2):346-352, Feb. 2012.
The International Search Report and Written Opinion from PCT/US2013/073936.
Cheng, G. et al. "Effect of Ionic Liquid Treatment on the Structures of Lignins in Solutions: Molecular Subunits Released from Lignin." *Langmuir.* 2012, 28, 11850-11857.

* cited by examiner

*Primary Examiner* — Liam J Heincer

(74) *Attorney, Agent, or Firm* — Kilpatrick Townsend & Stockton LLP

(57) ABSTRACT

The present invention provides novel and improved processes for treating a lignocellulosic biomass or technical lignin using ionic liquids to obtain lignin breakdown products and polysaccharide biomass components. Recycling of ionic liquids can be included in the methods of the invention.

11 Claims, 15 Drawing Sheets

RENEWABLE AROMATICS FROM LIGNOCELLULOSIC LIGNIN

CROSS-REFERENCE TO RELATED APPLICATIONS

The present application is a continuation-in-part of U.S. patent application Ser. No. 14/650,506, which is a national stage entry of International Pat. Appl. No. PCT/US2013/073936, filed Dec. 9, 2013, which claims priority to U.S. Provisional Pat. Appl. No. 61/734,898, filed Dec. 7, 2012, which applications are incorporated herein by referenced in their entirety. The present application also claims the benefit of priority to U.S. Provisional Pat. Appl. No. 62/096,467, filed Dec. 23, 2014, which application is incorporated herein by referenced in its entirety.

STATEMENT AS TO RIGHTS TO INVENTIONS MADE UNDER FEDERALLY SPONSORED RESEARCH AND DEVELOPMENT

The invention described and claimed herein was made utilizing funds supplied by the U.S. Department of Energy under Contract No. DE-AC02-05CH11231. The government has certain rights in this invention.

BACKGROUND OF THE INVENTION

Biorefineries process biological materials such as lignocellulosic biomass, or components derived therefrom, to extract and produce valuable materials. Lignin utilization is a key biorefinery concept, and efficient lignin utilization is important for improving the economic viability of biorefineries. New technologies are needed to convert polymeric lignin into high value low molecular weight and/or monomeric feedstocks, including aromatic feedstocks.

Lignocellulosic biomass is derived from agricultural wastes, forest residues and dedicated energy crops. In recent years, tremendous effort has been applied to develop methods for extraction of useful compounds from lignocellulosic biomass. However, one of the greatest limitations facing the economic viability of this technology is the recalcitrant nature of the lignocellulosic biomass, which resists breakdown and extraction of useful compounds. This resistance necessitates the use of treatment steps to enhance the accessibility to and depolymerization of the carbohydrate and lignin components present in the lignocellulosic biomass. Most treatment processes are comprised of thermo-chemical processes that utilize combinations of high temperatures and pressures, or dilute acids or alkalis, to open up the structure of the biomass. Such processes necessitate the use of specialized equipment and high-energy inputs.

Polymeric lignin may be produced in various industrial processes such as during the pulping of hard and softwoods. Generally, it is produced as a byproduct in the paper and pulp industry. Polymeric lignin includes kraft lignin, produced via the kraft process, lignosulfonates, produced, e.g. from the sulfite pulping process, alkali lignin, produced, e.g. from treating the black liquor from the soda process with acid, and low sulfonate alkali lignin. As with lignocellulosic biomass, high-value lignin compounds may be further extracted, purified, and/or derivatized from polymeric lignin.

Ionic liquids (ILs) have come into prominence over recent years and have been used as innovative fluids for chemical processing. They are known as environmentally friendly solvents primarily due to their low volatility and their potential recyclability. Recently, the use of ILs for the treatment of biomass has been shown to be a promising technology, allowing for the solubilization of crystalline cellulose from biomass under relatively mild conditions.

The ionic liquid treatment process can generally be described as the dissolution of biomass into the ionic liquid at an elevated temperature with stirring, followed by the addition of a precipitant (or, alternatively, an anti-solvent) that precipitates the biomass from solution. This precipitant or anti-solvent is typically either water or ethanol, or some other solvent with hydrogen bonding capacity. Once the biomass has been precipitated, solid/liquid separation and downstream enzymatic or chemical processes of the now amorphous biomass may result in useful products.

Lignin components isolated from lignocellulosic biomass or polymeric lignin find use in many industrial processes such as the production of vanillin, flavorings and perfumes, plastics and polymers, carbon fiber, binders, adhesives, oil drilling mud, mud-sand cements, flame retardants, lime plaster, storage battery plates, nitrogenous fertilizers, gypsum wallboards, or as a dispersant, flotation agent, emulsifier, stabilizer, grinding agent, electrolytic refining agent, protein precipitant, tanning agent, crystal growth inhibitor, or as packaging material. Lignin is also a natural and renewable source for many low molecular weight chemicals like benzene, phenol, guaiacol, vanillic acid, methanol, acetic acid, DMSO, etc. Moreover, due to the high chemical energy of these lignin compounds, they can be used as fuel by directly burning, or conversion into a coal or petroleum substitute. Importantly, lignin components isolated from lignocellulosic biomass represent the only renewable source of these useful lignin-derived compounds.

Although treatment of lignocellulosic biomass with ionic liquids has met with success, ionic liquids are expensive and the treatment process is both energy and time intensive. As such, what is needed in the art is a process that employs less ionic liquid via higher loading capacity, and produces a supply of commercially useful, high-value, and renewable lignin compounds to help improve overall process economics. The present invention provides a treatment process that fulfills these and other needs.

BRIEF SUMMARY OF THE INVENTION

In one embodiment, the present invention comprises a method that includes contacting a starting material containing polymeric lignin with an ionic liquid to generate a solubilized material for at least about 3 hours, and extracting low molecular weight or monomeric non-polar aromatic lignin compounds from the ionic liquid with an extractant.

In another embodiment, the method further comprises precipitating a fraction of the solubilized material with a polar solvent to generate a precipitated fraction and a supernatant, and separating the precipitated fraction from the supernatant.

In some embodiments, the polar solvent of the precipitating step is selected from the group consisting of water, methanol, ethanol, propanol, isopropanol, butanol, pentanol, hexanol, heptanol, octonol, or isooctonol.

In some embodiments, the extractant is a non-polar solvent. In some embodiments, the extractant is selected from the group consisting of water, methanol, ethanol, propanol, isopropanol, butanol, pentanol, hexanol, heptanol, octanol, isooctonol, benzene, toluene, acetone, pentane, hexane, heptane, octane, isooctane, and a second IL. In some embodiments, the extractant is benzene, toluene, acetone, pentane, hexane, heptane, octane, or isooctane.

In some embodiments, the extracting step further comprises separating the extractant from the ionic liquid.

In some embodiments of the present invention, the ionic liquid is water miscible.

In one aspect of the present invention, the ionic liquid is [C$_2$mim][OAc].

In some embodiments of the present invention, the starting material is polymeric lignin or lignin-containing biomass.

In some embodiments of the present invention, the method further comprises separating the extracted lignin compounds from the non-polar solvent.

In some embodiments of the present invention, the step of separating the extracted lignin compound comprises distillation, or column fractionation.

One embodiment of the present invention includes a composition containing low molecular weight or monomeric non-polar aromatic lignin compounds formed from: i) solubilizing a lignocellulosic biomass or polymeric lignin in a solution comprising a water-miscible ionic liquid (IL); ii) extracting the lignin compounds from the ionic liquid by contacting the ionic liquid with an extractant; and iii) separating the lignin compounds from the non-polar solvent.

In some embodiments of a composition of the present invention, the ionic liquid is [C$_2$mim][OAc].

In some embodiments of a composition of the present invention, the extractant is selected from the group consisting of water, methanol, ethanol, propanol, isopropanol, butanol, pentanol, hexanol, heptanol, octanol, isooctonol, benzene, toluene, acetone, pentane, hexane, heptane, octane, isooctane, and a second IL.

In a related aspect, the present invention provides a method including:

forming a pretreatment mixture containing a starting material and an ionic liquid under conditions sufficient to form a solubilized material, wherein the starting material comprises lignin, cellulose, hemicellulose, or a combination thereof;

precipitating at least a fraction of the solubilized material with a precipitant to generate a precipitated fraction and a supernatant;

separating the precipitated fraction from the supernatant;

combining the separated supernatant with a solvent that promotes phase separation of the ionic liquid and the precipitant; and isolating the ionic liquid.

In some embodiments of this related aspect, the ionic liquid comprises [C$_2$mim][OAc]. In some embodiments, the precipitant is selected from octanol, hexanol, butanol, and mixtures thereof. In some embodiments, the solvent that promotes phase separation of the ionic liquid and the precipitant is selected from water, ethanol, acetone, and combinations thereof.

In some embodiments, the method further includes extracting low molecular weight or monomeric non-polar aromatic lignin compounds from the supernatant with an extractant. In some embodiments, the precipitated fraction contains cellulose, hemicellulose, or mixtures thereof.

In some embodiments of this related aspect, the pretreatment mixture contains from about 5% to about 50% lignocellulosic biomass by weight. In some embodiments, the pretreatment mixture contains about 15% lignocellulosic biomass by weight.

In some embodiments of this related aspect, the precipitating step includes adding from about 0.1 volumes to about 10 volumes of precipitant (with respect to the ionic liquid) are added to the pretreatment mixture. In some embodiments, about 2-3 volumes of precipitant are added to the pretreatment mixture.

In some embodiments of this related aspect, the combining step includes adding the phase separation-inducing solvent to the separated supernatant in an amount of from about 1% (v/v) to about 50% (v/v). In some embodiments, the phase separation-inducing solvent is added to the separated supernatant in an amount of about 10% (v/v).

In some embodiments of this related aspect, the method further includes reusing the ionic liquid and/or the precipitant. In some embodiments, the ionic liquids and/or precipitants are reused at least 3 times.

In some embodiments of this related aspect, the method includes:

forming a reaction mixture containing a starting material and [C$_2$mim][OAc] under conditions sufficient to form a solubilized material, wherein the starting material comprises lignin, cellulose, and hemicellulose;

precipitating a fraction of the solubilized material with octanol to generate a precipitated fraction and a supernatant comprising the [C$_2$mim][OAc] and the octanol;

separating the precipitated fraction from the supernatant;

combining the separated supernatant with water in an amount sufficient to promote phase separation of the [C$_2$mim][OAc] and the octanol; and isolating at least a portion of the [C$_2$mim][OAc].

DETAILED DESCRIPTION OF THE INVENTION

I. Overview

Figure 1A:
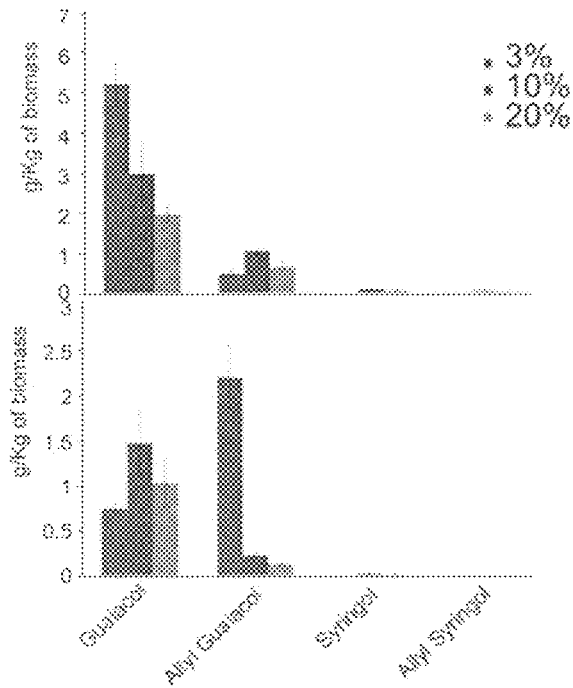
FIG. 1A depicts major lignin breakdown products from kraft lignin (top panel) and low sulfonate alkali lignin (bottom panel) after dissolution at 160° C. for 6 hours with different biomass loading.

In one aspect, the invention provides a method for the production of lignin compounds from starting material comprising lignin, such as lignocellulose-containing biomass or polymeric lignin, where the method includes contacting, and depolymerizing the starting material with one or more ionic liquids. High-value lignin compounds can be extracted from biomass, such as lignocellulose-containing biomass, or from polymeric lignin produced as a byproduct of the paper and pulp industry. Processes of the present invention provide high-value lignin compounds. In some embodiments, the compounds provided by the methods of the present invention include aromatic lignin compounds such as phenols, guaicols, syringols, eugenol, conyferols, and catechols. In some embodiments, these feedstocks may be oxidized into other useful compounds such as vanillin, vanillic acid, syringaldehyde, and the like. In other embodiments, the feedstocks may be derivatized into useful compounds such as benzene and substituted benzenes, toluene, xylene, styrenes, biphenyls, cyclohexane, phenol and substituted phenols, and methoxy phenols and substituted methoxy phenols. These lignin compounds can be further derivatized to produce commercially useful chemicals and fuel or used directly. For example, chemicals and products produced or extracted from lignin by methods of the present invention include but are not limited to lignin fertilizers, lignin carbon fibers, pulping catalysts, DMSO, catechol, cresols, resorcinol, lignin rubber, lignin starch films, lignosulfonates, lignin thermosets, lignin binders, quinones, cyclohexane, lignin asphalt, lignin polyblend, cyclohexanol, arboform, and any of the aforementioned chemicals or compounds.

In some embodiments, the treatment process is carried out employing a lignocellulose biomass. For example, the lignocellulose may be treated in order to break the polymeric lignin seal and disrupt the crystalline structure of cellulose. Alternatively, polymeric lignin, obtained e.g. from the paper and pulp industry, is treated in accordance with the invention. In various embodiments, the biopolymers such as polymeric lignin, cellulose, or hemicellulose may be partially or completely depolymerized by this process, partially or completely derivatized by this process, or extracted by this process and depolymerized or derivatized by an additional chemical or enzymatic step. The lignin fraction may be recovered, e.g., by precipitation or liquid-liquid extraction. The ionic liquids may optionally be recovered as well, e.g., by distillation or liquid-liquid extraction.

The present invention provides an ionic liquid treatment process that has significant advantages over the presently used ionic liquid treatment processes. In the treatment process of the present invention, the lignocellulosic biomass or polymeric lignin is contacted with an ionic liquid for a time, and in a manner, sufficient to release and/or generate high-value lignin compounds. It has surprisingly been found that the methods of the present invention provide a low cost method for extraction of high-value and renewable lignin compounds.

II. Starting Material a. Biomass

As used herein, the phrase "biomass" refers to lignocellulosic materials comprised of lignin-containing any mix of cellulose, hemicelluloses, and lignin as the major constituents. In the context of this invention "lignocellulosic biomass" is used interchangeably with "cellulosic biomass". Both terms refer to biomass that comprise lignin. "Biomass" for use in the process of the present invention includes any biomass or mixtures thereof that contains lignin or lignocellulose. Lignocellulose-containing biomass primarily consists of cellulose, hemicelluloses, and lignin. Woody biomass, for instance, is about 45-50% cellulose, 20-25% hemicellulose and 20-25% lignin. Herbaceous materials have lower cellulose, lower lignin and higher hemicellulose contents.

Cellulose is a linear beta 1→4 linked polymer of glucose. It is the principal component of all higher plant cell walls. In nature, cellulose exists in crystalline and amorphous states. The thermodynamic stability of the beta 1→4 linkage and the capacity of cellulose to form internal hydrogen bonds gives it great structural strength. Cellulose is degraded to glucose through hydrolytic cleavage of the glycosidic bond.

Hemicellulose is a term used to refer to a wide variety of heteropolysaccharides found in association with cellulose and lignin in both woody and herbaceous plant species. The sugar composition varies with the plant species, but in angiosperms, the principal hemicellulosic sugar is xylose. Like cellulose, xylose occurs in the beta 1→4 linked backbone of the polymer. In gymnosperms, the principal component sugar is mannose. Arabinose is found as a side branch in some hemicelluloses.

Lignin is a phenylpropane polymer of monolignol monomers. It is generally found as an integral part of the secondary cell walls of plants and certain types of algae. There are three monolignol monomers, methoxylated to various degrees: p-coumaryl alcohol, coniferyl alcohol, and sinapyl alcohol. These lignols are incorporated into lignin in the form of the phenylpropanoids p-hydroxyphenyl (H), guaiacyl (G), and syringyl (S), respectively. Gymnosperms have a lignin that consists almost entirely of G with small quantities of H. That of dicotyledonous angiosperms is more often than not a mixture of G and S (with very little H), and monocotyledonous lignin is a mixture of all three. Many grasses have mostly G, while some palms have mainly S. All lignins contain small amounts of incomplete or modified monolignols, and other monomers are prominent in non-woody plants. Unlike cellulose and hemicellulose, lignin cannot be depolymerized by hydrolysis. Cleavage of the principal bonds in the lignin polymer generally proceeds through oxidation.

In one embodiment, the biomass is a lignocellulose-containing material (or, alternatively, lignocellulose biomass). In a preferred embodiment the lignocellulose-containing material contains at least 30 wt.-%, at least 50 wt.-%, at least 70 wt.-%, or at least 90 wt.-% lignocellulose. It will be understood by those of skill that the lignocellulose-containing material can also comprise other constituents, such as proteinaceous material, starchy material, and sugars, such as fermentable sugars and/or un-fermentable sugars.

Lignocellulose biomass is generally found, for example, in the stems, leaves, hulls, husks, and cobs of plants or leaves, branches, and wood of trees. Lignocellulose biomass can also be, but is not limited to, herbaceous material, agricultural residues, forestry residues, municipal solid wastes, waste paper, and pulp and paper mill residues. It is to be understood that lignocellulose biomass may be in the form of plant cell wall material containing lignin, cellulose and hemicellulose in a mixed matrix.

In a some embodiments, the lignocellulose biomass includes, but is not limited to, switchgrass, pine, eucalyptus, corn stover, corn fiber, hardwood, such as poplar and birch, softwood, cereal straw, such as, wheat straw, switch grass, Miscanthus, rice hulls, or mixtures thereof. Other examples include corn fiber, rice straw, wheat bran, pine wood, wood chips, poplar, bagasse, paper and pulp processing waste.

In some embodiments of the present invention, biomass is mechanically ground, chipped, cracked, fractured, steam-exploded, ammonia fiber expanded, separated, crushed, or pre-treated with hot water, $CO_2$, acid, or base, or a combination thereof prior to, during, or after contacting with ionic liquid.

a. Technical Lignin

In some embodiments of the present invention, methods and compositions are provided for obtaining high-value low molecular weight or monomeric lignin compounds from technical lignins. Technical lignins, or polymeric lignins, are most commonly derived as a byproduct of the paper and pulp industry. For example, kraft lignin may be obtained via the kraft process, lignosulfonates, may be produced, e.g. from the sulfite pulping process, alkali lignin, may be produced, e.g. from treating the black liquor from the soda process with acid, and low sulfonate alkali lignin may be obtained as a byproduct of wood pulping. It is understood by those in the art that the precise source for technical lignin is not critical for the methods of the present invention. Rather the methods of the present invention are suitable for deriving high-value low molecular weight or monomeric lignin compounds from a wide range of polymeric lignin sources.

In some embodiments of the present invention, polymeric lignin is mechanically ground, chipped, cracked, fractured, steam-exploded, ammonia fiber expanded, separated, crushed, or pre-treated with hot water, $CO_2$, acid, or base, or a combination thereof prior to, during, or after contacting with ionic liquid.

III. Treatment

The present invention provides a process for treating a biomass or polymeric lignin starting material, the process comprising: contacting the starting material with an ionic liquid, to form a composition comprising ionic liquid and starting material, for a time sufficient to treat the starting material. One of skill in the art will understand the length of time required to treat the starting material. Alternatively, one of skill in the art will know how to determine a sufficient time to treat the starting material. The length of time required to be sufficient may vary based on the composition or source of the starting material, the methods of the present invention utilized to treat the starting material, and the goal of the treatment process. In some embodiments, a sufficient time may be selected to partially or completely solubilize lignin or a useful fraction thereof, partially or completely depolymerize lignin or a useful fraction thereof, extract high-value compounds, derivatize or oxidize lignin, or a combination thereof. Starting material that has been treated for a sufficient time is herein referred to as treated material. In some embodiments of the present invention, starting material is contacted with ionic liquid for a time significantly longer than required for cellulose extraction from lignocellulosic biomass.

The contacting can comprise agitating or stirring (at, e.g., 200 to about 400 rpm) the starting material and the ionic liquid to ensure complete mixing of the two. Additionally, the agitating or stirring may be performed for a time sufficient to treat the starting material. Typically, the starting material is contacted with the ionic liquid for a period of time ranging from about 0.5 to about 12 hours. In one embodiment, starting material (e.g. biomass or polymeric lignin) is contacted with the ionic liquid for a period of time ranging from at least about 0.5 to at least about 24 hours. In another embodiment, starting material is contacted with the ionic liquid for at least about 1, 2, 3, 6, 8, 10, 12, 14, 16, 18, or 20 hours. In yet other embodiments, the starting material is contacted with ionic liquid for between about 1 to about 24 hours, between about 2 to about 18 hours, between about 3 to about 16 hours, between about 4 to about 12 hours, or between about 6 to 10 hours. In some cases, the contacting may be performed for any of the foregoing durations, or 0.5 hrs longer or shorter than said foregoing durations.

Typically, the contacting is at a temperature ranging from about 25° C. to about 200° C. In a preferred embodiment, the contacting is at a temperature ranging from about 100° C. to about 180° C., or at a temperature of about 120° C. or 160° C. In other embodiments, the contacting may be performed at a temperature of approximately 90, 100, 110, 120, 130, 140, 150, 160, 170, or 180° C. In some cases, the contacting may be performed at a temperature of at least about 90, 100, 110, 120, 130, 140, 150, 160, 170, or 180° C. For example, the contacting may be performed at a temperature of between about 100 to about 180° C., between about 110 to about 170° C., or between about 120 to about 160° C. In yet other embodiments, the contacting may be performed at any of the foregoing temperatures, or 5° C. above or below said foregoing temperatures.

Ionic liquids (ILs) are salts that are liquids rather than crystals at room temperatures. It will be readily apparent to those of skill that numerous ILs can be used in the treatment process of the present invention. In some embodiments of the invention, the IL is suitable for treatment of the starting material and for subsequent enzymatic or chemical processing. Suitable ILs are taught in ChemFiles (2006) 6(9) (which are commercially available from Sigma-Aldrich; Milwaukee, Wis.). Such suitable ILs include, but are not limited to, 1-alkyl-3-alkylimidazolium alkanate, 1-alkyl-3-alkylimidazolium alkylsulfate, 1-alkyl-3-alkylimidazolium methylsulfonate, 1-alkyl-3-alkylimidazolium hydrogensulfate, 1-alkyl-3-alkylimidazolium thiocyanate, and 1-alkyl-3-alkylimidazolium halide, wherein an "alkyl" is an alkyl group comprising from 1 to 10 carbon atoms, and an "alkanate" is an alkanate comprising from 1 to 10 carbon atoms. In some embodiments, the "alkyl" is an alkyl group comprising from 1 to 4 carbon atoms. In some embodiments, the "alkyl" is a methyl group, ethyl group or butyl group. In some embodiments, the "alkanate" is an alkanate comprising from 1 to 4 carbon atoms. In some embodiments, the "alkanate" is an acetate. In some embodiments, the halide is chloride.

In some embodiments, the IL includes, but is not limited to, 1-ethyl-3-methylimidazolium acetate (EMIM Acetate) or ([$C_2$mim][OAc]), 1-ethyl-3-methylimidazolium chloride (EMIM Cl), 1-ethyl-3-methylimidazolium hydrogensulfate (EMIM HOSO$_3$), 1-ethyl-3-methylimidazolium methylsulfate (EMIM MeOSO$_3$), 1-ethyl-3-methylimidazolium ethylsulfate (EMIM EtOSO$_3$), 1-ethyl-3-methylimidazolium methanesulfonate (EMIM MeSO$_3$), 1-ethyl-3-methylimidazolium tetrachloroaluminate (EMIM AlCl4), 1-ethyl-3-methylimidazolium thiocyanate (EMIM SCN), 1-butyl-3-methylimidazolium acetate (BMIM Acetate), 1-butyl-3-methylimidazolium chloride (BMIM Cl), 1-butyl-3-methylimidazolium hydrogensulfate (BMIM HOSO$_3$), 1-butyl-3-methylimidazolium methanesulfonate (BMIM MeSO$_3$), 1-butyl-3-methylimidazolium methylsulfate (BMIM MeOSO$_3$), 1-butyl-3-methylimidazolium tetrachloroaluminate (BMIM AlCl4), 1-butyl-3-methylimidazolium thiocyanate (BMIM SCN), 1-ethyl-2,3-dimethylimidazolium ethylsulfate (EDIM EtOSO$_3$), Tris(2-hydroxyethyl)methylammonium methylsulfate (MTEOA MeOSO$_3$), 1-methylimidazolium chloride (MIM Cl), 1-methylimidazolium hydrogensulfate (MIM HOSO$_3$), 1,2,4-trimethylpyrazolium methylsulfate, tributylmethylammonium methylsulfate, choline acetate, choline salicylate, and the like. The ionic liquid can comprise one or a mixture of the compounds. Additional ILs suitable for use in the present invention are taught in U.S. Pat. No. 6,177,575, which is herein incorporated by reference. It will be appreciated by those of skill in the art that other ionic liquids that will be useful in the process of the present invention are currently being developed or will be developed in the future, and the present invention contemplates their future use.

In some embodiments of the present invention, starting material is contacted with a water miscible ionic liquid. In other embodiments of the present invention, a water immiscible ionic liquid is employed. One of skill in the art can readily determine the water solubility of an ionic liquid empirically. In some cases, a water immiscible ionic liquid may be utilized to extract more non-polar compounds. In some cases, a water miscible ionic liquid may be utilized to be compatible with other processes such as recovery of cellulose and/or hemicellulose that is facile to enzymatic or chemical depolymerization via precipitation. Example water miscible ionic liquids include, but are not limited to, 1-ethyl-3-methylimidazolium acetate (EMIM Acetate) or ([$C_2$mim][OAc]), 1-ethyl-3-methylimidazolium chloride (EMIM Cl), 1-ethyl-3-methylimidazolium hydrogensulfate (EMIM HOSO$_3$), 1-ethyl-3-methylimidazolium methylsulfate (EMIM MeOSO$_3$), 1-ethyl-3-methylimidazolium ethylsulfate (EMIM EtOSO$_3$), 1-ethyl-3-methylimidazolium methanesulfonate (EMIM MeSO$_3$), 1-ethyl-3-methylimidazolium tetrachloroaluminate (EMIM AlCl4), 1-ethyl-3-methylimidazolium thiocyanate (EMIM SCN), 1-butyl-3-methylimidazolium acetate (BMIM Acetate), 1-butyl-3-methylimidazolium chloride (BMIM Cl), 1-butyl-3-methylimidazolium hydrogensulfate (BMIM HOSO$_3$), 1-butyl-3-methylimidazolium methanesulfonate (BMIM MeSO$_3$), 1-butyl-3-methylimidazolium methylsulfate (BMIM MeOSO$_3$), 1-butyl-3-methylimidazolium tetrachloroaluminate (BMIM AlCl4), 1-butyl-3-methylimidazolium thiocyanate (BMIM SCN), 1-ethyl-2,3-dimethylimidazolium ethylsulfate (EDIM EtOSO$_3$), Tris(2-hydroxyethyl)methylammonium methylsulfate (MTEOA MeOSO$_3$), 1-methylimidazolium chloride (MIM Cl), 1-methylimidazolium hydrogensulfate (MIM HOSO$_3$), 1,2,4-trimethylpyrazolium methylsulfate, tributylmethylammonium methylsulfate, choline acetate, choline salicylate, and the like. Example water immiscible ionic liquids include, but are not limited to: N-Butyl-3-methylpyridinium bis(trifluoromethylsulfonyl)imide, (BMPIm BTI), 1,2-Dimethyl-3-propylimidazolium bis(trifluoromethylsulfonyl)imide, (DMPIIm BTI), 1,2-Dimethyl-3-propylimidazolium tris(trifluoromethylsulfonyl)methide, (DMPIMe TTI), 1-Ethyl-3-methylimidazolium bis(pentafluoroethylsulfonyl)imide, (EMIBeti BPI), 1-Ethyl-3-methylimidazolium bis(trifluoromethylsulfonyl)imide, (EMIIm BTI), N-Propyl-3-methylpyridinium bis(trifluoromethylsulfonyl)imide, (PMPIm BTI), and the like.

The ionic liquid (IL) may be of a concentration of more than 0% and up to 100% of the composition or solution containing starting material. In some embodiments, the starting material is mixed with ionic liquid, and the ionic liquid is of a concentration of more than 70% and up to 100% of the composition or solution, more than 80% and up to 100%, or more than 90% and up to 100%. The upper range of the concentration of IL in a composition containing starting material may be equal to or less than 100%, equal to or less than 90%, equal to or less than 80%, equal to or less than 70%, equal to or less than 60%, or equal to or less than 55%. In other embodiments, the IL in a composition containing starting material may be of a concentration of more than 0% to less than 60% of the composition or solution. In some embodiments, the concentration of IL in a composition containing starting material is equal to or more than 90%, equal to or more than 91%, equal to or more than 93%, or equal to or more than 94%, 95%, 96%, 97%, 98%, 99%, 99.5%, or 99.9%. In other embodiments, the concentration of IL in a composition containing starting material is equal to or more than 1%, 2%, 3%, 4%, 5%, 10%, 15%, 20%, 30%, 40%, 50%, 60%, 75%, 80%, or 90%.

In some embodiments of the invention, a co-solvent is used. Advantageously, the use of co-solvents may reduce the IL requirements, which may help increase the economic viability of this treatment process. In addition, the use of co-solvents may reduce the viscosity of the starting material-IL-co-solvent mixture, thereby increasing loading (i.e., the proportion of starting material used in a given volume of IL). As such, in one embodiment, the starting material is contacted with the ionic liquid and a co-solvent for a time sufficient to treat the starting material. Suitable co-solvents include, but are not limited to water, acetone, propylene carbonate, isopropyl alcohol, ethanol, dimethyl sulfoxide (DMSO), and the like. Typically, the ionic liquid:co-solvent mixture is about 20%:80% to about 80%:20%.

It will be apparent to those of skill in the art that the solution containing the IL can further comprise NaCl or other mineral salt, such as up to 10 mM of NaCl, LiCl, $CaCl_2$ or $MgCl_2$. In addition, the solution can further comprise a suitable buffer and other additives that are beneficial to the treatment process.

Once the contacting step is complete, a portion of the starting or treated material can be reconstituted. In one embodiment, the treated material is reconstituted using a precipitant (or an anti-solvent). Advantageously, the use of a precipitant may facilitate recovery of IL, treated material, starting material, reconstituted biomass, and/or lignin compounds including high-value low molecular weight or monomeric aromatic or non-polar lignin compounds, which may help increase the economic viability of this treatment process. In some embodiments, the precipitant is water, methanol, ethanol, propanol, butanol, pentanol, hexanol, heptanol, or octanol. The ionic liquid may then be separated from the treated material, further extracted, and recycled using standard liquid-solid separation techniques. The solid treated material residue may then be washed to ensure substantial removal of the ionic liquid, and the solid treated material may be subjected to downstream processes, including but not limited to, enzymatic hydrolysis and then fermentation using procedures known to and used by those of skill in the art.

In some embodiments, the methods of the invention include recycling the ionic liquid after pretreatment of lignocellulose-containing biomass or polymeric lignin. Recycling the ionic liquid typically includes separating the ionic liquid from the precipitant by combining the supernatant with a solvent that promotes phase separation of the ionic liquid and the precipitant. The precipitant can then be removed from the ionic liquid, and both fractions can be re-used in the methods of the invention. In some embodiments, the precipitant is octanol. In some embodiments, the precipitant is selected from octanol, hexanol, butanol, and mixtures thereof. In some embodiments, water is used as the solvent that promotes phase separation of the ionic liquid and the precipitant. In some embodiments, the solvent that promotes phase separation of the ionic liquid and the precipitant is selected from water, ethanol, acetone, and combinations thereof.

Accordingly, some embodiments of the present invention provide a method including:

forming a pretreatment mixture containing a starting material and an ionic liquid under conditions sufficient to form a solubilized material, wherein the starting material comprises lignin, cellulose, hemicellulose, or a combination thereof;

precipitating at least a fraction of the solubilized material with a precipitant to generate a precipitated fraction and a supernatant;

separating the precipitated fraction from the supernatant;

combining the separated supernatant with a solvent that promotes phase separation of the ionic liquid and the precipitant; and isolating the ionic liquid.

In some embodiments, the method further includes isolating the precipitant. In some embodiments, the method further includes reusing the ionic liquid or the precipitant. In some embodiments, the method further includes extracting low molecular weight or monomeric non-polar aromatic lignin compounds from the supernatant with an extractant. In some embodiments, the precipitated fraction contains cellulose, hemicellulose, or mixtures thereof.

In some embodiments, the method includes: contacting a starting material comprising lignin, cellulose, and/or hemicellulose with an ionic liquid to generate a solubilized material; precipitating a fraction of the solubilized material with octanol to generate a precipitated fraction and a supernatant comprising the ionic liquid and the octanol; separating the precipitated fraction from the supernatant; combining the separated supernatant with water in an amount sufficient to promote phase separation of the ionic liquid and the octanol; and isolating the ionic liquid. In some embodiments, the ionic liquid is [$C_2$mim][OAc].

In some embodiments, the method includes forming a mixture containing an ionic liquid and from about 5% to about 50% lignocellulosic biomass by weight. In some embodiments, the mixture contains from about 10% to about 30% lignocellulosic biomass by weight. In some embodiments, the mixture contains about 15% lignocellulosic biomass by weight. In some embodiments, the mixture contains about 15% switchgrass by weight in [$C_2$mim][OAc]. Following pretreatment according to the methods described herein (e.g., at about 120-130° C. for about 1-3 h), a precipitant is added to the mixture. Any suitable amount of precipitant can be used. For example, from about 0.1 volumes to about 10 volumes of precipitant (with respect to the ionic liquid) can be added to the mixture. In some embodiments, from about 1 volume to about 4 volumes of precipitant is added to the mixture. In some embodiments, about 2-3 volumes of precipitant are added to the mixture. In some embodiments, about 2 volumes of octanol are added to the mixture containing the treated lignocellulosic biomass and [$C_2$mim][OAc]. Precipitated material can be separated from the result mixture via centrifugation.

Any suitable amount of solvent can be used to induce phase separation of the ionic liquid and the precipitant in the supernatant. In some embodiments, the solvent is added to the supernatant in an amount of from about 1% (v/v) to about 50% (v/v). In some embodiments, the solvent is added to the supernatant in an amount of from about 1% (v/v) to about 20% (v/v). In some embodiments, the solvent is added to the supernatant in an amount of from about 5% (v/v) to about 15% (v/v). In some embodiments, the solvent is added to the supernatant in an amount of less than about 30% (v/v). In some embodiments, the solvent is added to the supernatant in an amount of about 10% (v/v). In some embodiments, about 10% water (v/v) is added to a supernatant containing octanol and [C$_2$mim][OAc], wherein octanol:[C$_2$mim][OAc] ratio is from about 2:1 to about 3:1. In such embodiments, the octanol and the [C$_2$mim][OAc] be removed from the mixture for re-use in the methods of the invention.

Ionic liquids and/or precipitants can be re-used multiple times in the methods of the invention. For example, the ionic liquids and/or precipitants can be reused 1, 2, 3, 4, 5, 6, 7, 8, 9, 10, or more times. In some embodiments, the ionic liquids and/or precipitants are reused at least 3 times. In some embodiments, the ionic liquids and/or precipitants are reused at least 6 times.

In some embodiments, precipitation is not be performed. For example, in some methods of the present invention, a technical lignin is contacted with an ionic liquid, and no precipitation is performed. In other methods of the present invention, a biomass is contacted with an ionic liquid and no precipitation is performed. In some cases, precipitation may be avoided if recovery of cellulose or hemicellulose is not desired. In other cases, cellulose or hemicellulose recovery may be performed by some other means known in the art.

In some embodiments of the invention, an extractant is utilized for liquid-liquid extraction of a desired compound or composition from the composition containing IL that has been contacted with starting material. Advantageously, the use of an extractant may facilitate recovery of IL, treated material, starting material, reconstituted biomass, lignin compounds including low molecular weight or monomeric aromatic or non-polar lignin compounds, or a combination thereof, which may help increase the economic viability of this treatment process. As such, in one embodiment, the composition containing ionic liquid and starting or treated material is contacted with an extractant. Suitable extractants include, but are not limited to water, methanol, ethanol, propanol, butanol, pentanol, hexanol, heptanol, octanol, benzene, toluene, acetone, pentane, hexane, heptane, octane, isooctane, a second IL, or other suitable solvents. In some embodiments, the extractant is a non-polar solvent. Those of skill in the art understand that the suitability of a solvent extractant for liquid-liquid extraction from an IL will vary based on a number of factors including but not limited to the initial IL utilized, the relative hydrophobicity or polarity of the compounds to be extracted, and the pH at which the extraction is to be performed. In one embodiment, benzene, hexane, or pentane is used to extract low molecular weight or monomeric lignin compounds, e.g., relatively non-polar lignin compounds from a composition containing IL and treated material. In another embodiment, benzene, hexane, or pentane is used to extract lignin compounds from a composition comprising the IL [C$_2$mim][OAc]. Typically, the ionic liquid:extractant mixture is from about 10%:90% to about 90%:10% of IL:extractant. In some embodiments, the mixture is about 50%:50% of IL:extractant. In other embodiments, the mixture is from about 20%-80% to about 80%-20% IL:extractant. In other embodiments, the extractant comprises about 1%, 3%, 5%, 7.5%, 10%, 12%, 15%, 20%, 25%, 30%, or 40% of the IL:extractant composition. In yet other embodiments, the extractant comprises about 60%, 65%, 70%, 75%, 80%, 85%, 90%, 95%, or 99% of the IL:extractant composition. One of skill in the art knows how to select a suitable proportion of IL:extractant.

IV. Purification

In some embodiments of the present invention, low molecular weight or monomeric lignin compounds may be further purified after liquid-liquid extraction. For example, extractant may be evaporated or distilled from the lignin compounds. Alternatively, extractant may be removed by the use of a suitable column, such as a reverse phase column, a size exclusion column, or an ion exchange column.

V. Examples

Example I

I.1. Materials

Kraft lignin was supplied from MeadWestvaco Corp., Richmond, Va. and low sulfonate alkali lignin was purchased from Sigma Aldrich. 1-ethyl-3-methyl imidazolium acetate ([C$_2$mim][OAc], 98%) was used as the solvent to depolymerize and dissolve lignin from the biomass. Benzene was used as the extraction solvent. Guaiacol, ethyl guaiacol, vinyl guaiacol, vanillin, eugenol, syringol, 4-allyl syringol, guaiacyl acetone and 2-methoxy, 4-propenyl phenol were used as standards to confirm the position and the mass to charge ratio of the Gas Chromatography/Mass Spectrometry (GC/MS) peaks. All the chemicals used in this study were purchased from Sigma Aldrich.

I.2 Lignin Dissolution

Technical lignins were dissolved in [C$_2$mim][OAc] at two different temperatures 160 and 120° C. in a conventional oven (Thelco Laboratory Oven, Jouan Inc, Virginia) for 1, 3, 6 and 12 hrs. Solid loading was held constant at 3 wt % (300 mg in 9.7 mL of [C$_2$mim][OAc]) and components were mixed at room temperature before being placed in the oven. 35 ml of hot water was added to the above sample to precipitate the dissolved material. The mixture of [C$_2$mim][OAc], water and precipitant was centrifuged to separate the solid (precipitant) and liquid ([C$_2$mim][OAc], water, and dissolved lignin products). The total precipitant recovered after pretreatment and the lignin content in the recovered precipitant is shown in Table 1. This mixture of [C$_2$mim][OAc] and water will be referred to as the supernatant for the rest of this report. Estimation (based on mass balance) of the amount of lignin left in the supernatant after dissolution for 6 hrs has also been shown in Table 1.

I.3 Lignin Extraction from the Supernatant

A total of 10 ml of benzene was added to the supernatant in two steps. The sample mixture (benzene+ sample) was mixed thoroughly and was then phase separated using a centrifuge. This allowed for all the non-polar compounds to be extracted from the supernatant to the benzene phase. This benzene solution was further concentrated under nitrogen to a final volume of 1 ml. This solution was then subjected to the GC-MS analysis.

I.4 Gas Chromatography-Mass Spectrometry

Analysis of the lignin breakdown compounds was performed using a GC-MS (Thermo Electron Corporation with Trace GC Ultra, Polaris-Q MS and TriPlus auto sampler). The compounds were separated using a TR-SMS (30 m, 0.25 mm ID, 0.25 μm) chromatographic column. 10 μl of the sample was injected into the GC at an inlet temperature of 220° C. and was operated in a split mode (split flow of 12 ml/min, split ratio=10). Helium was used as a carrier gas with a constant flow rate of 1.2 ml/min. The temperature of the GC was held at 45° C. for 1 min, was then increased at a rate 10° C./min up to 300° C. and was held at this temperature for 1 min. The MS was used until the end of GC run with a solvent delay of 3.5 min. The ion source was maintained at a temperature of 250° C. and the MS was operated in scan mode.

I.5 Results

The weight of the technical lignin recovered after IL dissolution is shown in Table 1. The amount of recovered solids is lower than the amount of the starting material (Table 1), indicating that lignin and other constituents remained in the supernatant. Various lignin breakdown products extracted from the supernatant, along with their elution time in GC-MS, are shown in Table 2. The lignin breakdown products depend on the starting material and the dissolution temperature. The lignin monomeric products mainly composed of methoxy-phenols and substituted methoxy-phenols. Guaiacol was the common product for the technical lignins.

TABLE 1

Biomass recovered after pretreatment and the lignin content of the biomass as a function of pretreatment temperature

| Biomass | Pretreatment Temperature | % Recovered | % Lignin Content | Lignin in Supernatant (mg)* |
|---|---|---|---|---|
| Kraft Lignin | 120° C. | 63 ± 5 | 100 | 44.4 |
|  | 160° C. | 60 ± 2 | 100 | 48 |
| LS | 120° C. | 29 ± 6 | 100 | 85.2 |
|  | 160° C. | 33 ± 1 | 100 | 80.4 |

*Calculated based on the lignin content of the untreated and recovered biomass

TABLE 2

Non-Polar Lignin breakdown products found in the benzene extract of the supernatant

| | Name | Compound | RT |
|---|---|---|---|
| 1 | Guaiacol | | 8.8 |
| 2 | 4-Ethyl Guaiacol | | 10.4 |
| 3 | 4-Vinyl Guaiacol | | 11.1 |
| 4 | Eugenol | | 11.61 |
| 5 | Syringol | | 12.03 |
| 6 | 4-(1-propenyl) Guaiacol | | 12.97 |
| 7 | Vanillin | | 13.54 |
| 8 | Allyl Syringol | | 14.49 |
| 9 | Guaiacylacetone | | 14.14 |
| 10 | Anthracene-$d_{10}$ | | 16.97 |

I.5.1 Lignin Products from Technical Lignins

For the technical lignins, vanillin is the major product observed at 120° C. 4-(1-propenyl) guaiacol from low sulfonate alkali lignin and, guaiacol and ethyl guaiacol from kraft lignin are also produced after dissolution in [$C_2$mim][OAc] at 120° C. On dissolution at 160° C., eugenol followed by guaiacol and 4-(1-propenyl) guaiacol are the major product from low sulfonate lignin. Kraft lignin dissolved at 160° C. produced guaiacol (major product), eugenol and 4-(1-propenyl) guaiacol. As these technical lignins were derived from softwood and do not contain any S-lignin in the original polymer, syringyl compounds were not produced on dissolution of these technical lignins.

The absence of guaiacylacetone and aldehyde derivatives (coniferaldehyde) and the presence of eugenol and 4-(1-propenyl) guaiacol in the supernatant suggests incomplete oxidation of aldehydes in [C$_2$mim][OAc] at these dissolution temperatures. These findings suggest that dissolution in [C$_2$mim][OAc] behaves similar to alkali pretreatment at lower temperature (e.g., 120° C.) and acid pretreatment at higher temperatures (e.g., 160° C.).

Example II

II.1. Materials

Switchgrass (*Panicum virgatum*, cultivar MPV2) was provided by the laboratory of Dr. Ken Vogel. *Pinus radiata* and *Eucalyptus globulus* was provided by Arborgen. 1-ethyl-3-methyl imidazolium acetate ([C$_2$mim][OAc], 98%) was used as the solvent to depolymerize and dissolve lignin from the biomass. Benzene was used as the extraction solvent. Guaiacol, ethyl guaiacol, vinyl guaiacol, vanillin, eugenol, syringol, 4-allyl syringol, guaiacyl acetone and 2-methoxy, 4-propenyl phenol were used as standards to confirm the position and the mass to charge ratio of the Gas Chromatography/Mass Spectrometry (GC/MS) peaks. All the chemicals used in this study were purchased from Sigma Aldrich.

II.2. Lignin Dissolution

Biomass was ground to 40 mesh before the dissolution process (Thomas-Wiley Mini Mill fitted with a 40-mesh screen; Model 3383-L10 Arthur H. Thomas Co., Philadelphia, Pa., USA). Biomass was dissolved in [C$_2$mim][OAc] at two different temperatures 160 and 120° C. in a conventional oven (Thelco Laboratory Oven, Jouan Inc, Virginia) for 1, 3, 6 and 12 hrs. Solid loading was held constant at 3 wt % (300 mg in 9.7 mL of [C$_2$mim][OAc]) and components were mixed at room temperature before being placed in the oven. 35 ml of hot water was added to the above sample to precipitate the dissolved biomass. The mixture of [C$_2$mim][OAc], water and biomass was centrifuged to separate the solid (recovered biomass) and the supernatant ([C$_2$mim][OAc] and water). The total biomass recovered after pretreatment and the lignin content in the recovered solids is shown in Table 3. Estimation (based on mass balance) of the amount of lignin left in the supernatant after dissolution for 6 hrs is also shown in Table 3.

II.3. Lignin Extraction from the Supernatant

A total of 10 ml of benzene was added to the supernatant in two steps. The sample mixture (benzene+ sample) was mixed thoroughly and was then phase separated using a centrifuge. This allowed for all the non-polar compounds to be extracted from the supernatant to the benzene phase. This benzene solution was further concentrated under nitrogen to a final volume of 1 ml. This solution was then subjected to the GC-MS analysis.

II.4. Gas Chromatography-Mass Spectrometry

Analysis of the lignin breakdown compounds was performed using a GC-MS (Thermo Electron Corporation with Trace GC Ultra, Polaris-Q MS and TriPlus auto sampler). The compounds were separated using a TR-SMS (30 m, 0.25 mm ID, 0.25 µm) chromatographic column. 10 µl of the sample was injected into the GC at an inlet temperature of 220° C. and was operated in a split mode (split flow of 12 ml/min, split ratio=10). Helium was used as a carrier gas with a constant flow rate of 1.2 ml/min. The temperature of the GC was held at 45° C. for 1 min, was then increased at a rate 10° C./min up to 300° C. and was held at this temperature for 1 min. The MS was used until the end of GC run with a solvent delay of 3.5 min. The ion source was maintained at a temperature of 250° C. and the MS was operated in scan mode.

II.5 Results

The weight of the biomass recovered after IL dissolution is shown in Table 3. The amount of recovered solids is lower than the amount of the starting material (Table 3), indicating that lignin and other biomass constituents remained in the supernatant. Various lignin breakdown products extracted from the supernatant, along with their elution time in GC-MS, are shown in Table 4. The lignin breakdown products depend on the biomass and the dissolution temperature. The lignin monomeric products mainly composed of methoxy-phenols and substituted methoxy-phenols. Guaiacol was the common product for both the biomass treated in this Example, and the technical lignins treated in Example 1.

TABLE 3

Biomass recovered after pretreatment and the lignin content of the biomass as a function of pretreatment temperature

| Biomass | Pretreatment Temperature | % Recovered | % Lignin Content | Lignin in Supernatant (mg)* |
|---|---|---|---|---|
| Switchgrass | Untreated | — | 33.2 | — |
|  | 120° C. | 65 ± 3 | 22 ± 3 | 56.7 |
|  | 160° C. | 40 ± 0.3 | 16 ± 1 | 80.4 |
| Pine Dust | Untreated | — | 30 | — |
|  | 120° C. | 90 ± 1 | 18 ± 1 | 41.4 |
|  | 160° C. | 78 ± 5 | 32 ± 2 | 15.12 |
| Eucalyptus | Untreated | — | 39.5 | — |
|  | 120° C. | 82 ± 1 | 27 ± 4 | 52.08 |
|  | 160° C. | 64 ± 1 | 48 ± 2 | 83.94 |

*Calculated based on the lignin content of the untreated and recovered biomass

TABLE 4

Non-Polar Lignin breakdown products found in the benzene extract of the supernatant

| | Name | Compound | RT |
|---|---|---|---|
| 1 | Guaiacol | 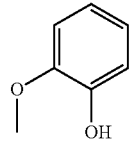 | 8.8 |
| 2 | 4-Ethyl Guaiacol | 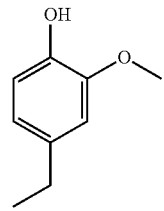 | 10.4 |

TABLE 4-continued

Non-Polar Lignin breakdown products found in the benzene extract of the supernatant

| | Name | Compound | RT |
|---|---|---|---|
| 3 | 4-Vinyl Guaiacol | | 11.1 |
| 4 | Eugenol | | 11.61 |
| 5 | Syringol | | 12.03 |
| 6 | 4-(1-propenyl) Guaiacol | | 12.97 |
| 7 | Vanillin | | 13.54 |
| 8 | Allyl Syringol | | 14.49 |
| 9 | Guaiacylacetone | | 14.14 |
| 10 | Anthracene-$d_{10}$ | | 16.97 |

II.5.1 Lignin Breakdown Products from Biomass

Dissolution of switchgrass in [$C_2$mim][OAc] at 120° C. produced vinyl guaiacol and a small quantity of guaiacylacetone. Guaiacylacetone is the only product produced on dissolution of pine at 120° C. No lignin breakdown products from eucalyptus on dissolution at 120° C. were observed. This may indicate lower dissolution of eucalyptus in [$C_2$mim][OAc] at 120° C. Guaiacol was the major product produced from all the lignocellulosics (switchgrass, pine and eucalyptus) after dissolution in [$C_2$mim][OAc] at 160° C. Dissolution of switchgrass at 160° C. also produced 4-(1-propenyl) guaiacol, syringol and guaiacylacetone. Due to the absence of S-lignin units in pine no syringyl-type of compounds were observed in the supernatant from pine. 4-(1-propenyl) guaiacol and guaiacylacetone were also produced from pine after dissolution at 160° C. S-type compounds of lignin products like syringol and allyl syringol along with 4-(1-propenyl) guaiacol on were observed after dissolution of eucalyptus at 160° C.

Presence of vinyl guaiacol in the supernatant produced from switchgrass pretreated at 120° C. indicates that alkaline conditions may be produced in [$C_2$mim][OAc] at this dissolution temperature. Guaiacylacetone is the major product produced from pine after dissolution at 120° C. This suggests that some of the treatment methods of the present invention result in acidic conditions. Formation of guaiacol and syringol at 160° C. indicates that high temperature (160° C.) [$C_2$mim][OAc] has acidic conditions. Similar to the case of technical lignins, formation of allyl guaial and allyl syringol from lignocellulosics at these treatment conditions may be due to incomplete oxidation.

II.6 Conclusions

In these Examples, [$C_2$mim][OAc] was used to produce monomeric aromatic compounds from two types of technical lignins and three types of lignocellulosics. Many G-monomers were present in the supernatant of technical lignins and biomasses after dissolution in [$C_2$mim][OAc] at 120 and 160° C. Guaiacol was the common product from both technical lignins and biomass, and was mostly produced at 160° C. S-monomers were present after dissolution of eucalyptus at 160° C. The results suggest the presence of acidic conditions in [$C_2$mim][OAc] at high dissolution temperatures. The reaction mechanisms and the conditions at 120° C. may be dependent on the biomass. This technology paves the path for the utilization of the lignin that is present in lignocellulosic biomass to produce lignin-derived chemicals. The products reported in this work only represent the non-polar monomeric components that were soluble in benzene. However, polar lignin products may be present in the supernatant and may be extracted. Alternatively a different extractant, other than benzene, may be utilized to obtain polar lignin products.

Example III

III.1. Materials

Kraft lignin was supplied from MeadWestvaco Corp., Richmond, Va. Low sulfonate alkali lignin was purchased from Sigma Aldrich. Switchgrass (*Panicum virgatum*, cultivar MPV2) was provided by the laboratory of Dr. Ken Vogel. Samples of *Pinus radiata* and *Eucalyptus globulus* were provided by Arborgen. 1-ethyl-3-methylimidazolium acetate ([C2mim][OAc], 98% purity) was used as the solvent to depolymerize and dissolve lignin from the biomass. Benzene was used as the extraction solvent. Guaiacol, ethyl guaiacol, vinyl guaiacol, vanillin, eugenol, syringol, 4-allyl syringol, guaiacyl acetone and 2-methoxy, 4-propenyl phenol were used as standards to confirm the position and the mass to charge ratio of the Gas Chromatography/Mass Spectrometry (GC/MS) peaks. All other chemicals used in this study were purchased from Sigma Aldrich and used as received.

III.2. Lignin Dissolution in IL

Samples were ground to 40 mesh before the dissolution process (Thomas-Wiley Mini Mill fitted with a 40-mesh screen; Model 3383-L10 Arthur H. Thomas Co., Philadelphia, Pa., USA). Technical lignins and biomass were dissolved in [$C_2$mim][OAc] at 120 and 160° C. in a conventional oven (Thelco Laboratory Oven, Jouan Inc, Virginia) for 6 hrs. Solid loading was varied from 3 wt % (300 mg in 9.7 mL of [$C_2$mim][OAc]) to 10 wt % and 20 wt %, and components were mixed at room temperature before being placed in the oven. To this mixture 10 µL of anthracene-$D_{10}$ was added as internal standard (IS) for quantification in GC/MS analysis. 35 mL of hot water (95° C.) was added to the sample to precipitate the dissolved biomass (mostly glucans, unsolubilized lignin). The mixture of [$C_2$mim][OAc], water, and biomass was then centrifuged to separate the solid (recovered biomass) and liquid ([$C_2$mim][OAc] and water). This mixture of [$C_2$mim][OAc] and water will be referred to as the supernatant for the rest of this report. After the collection of supernatant, the biomass was further washed ten times with 100 ml of water (10 ml/wash).

III.3. Lignin Extraction from the Supernatant

A total of 10 mL of benzene was added to the supernatant in two steps. The resultant mixture (benzene+ sample) was mixed thoroughly and was then phase separated using a centrifuge. This allowed for all the non-polar compounds to be extracted from the supernatant to the benzene phase. This benzene solution was further concentrated under nitrogen to a final volume of 1 ml.

III.4. Gas Chromatography-Mass Spectrometry (GC-MS)

The analysis of the lignin breakdown compounds present after benzene recovery was performed using a GC-MS (Thermo Electron Corporation with Trace GC Ultra, Polaris-Q MS and TriPlus auto sampler). The compounds were separated using a TR-SMS (30 m, 0.25 mm ID, 0.25 µm) chromatographic column. 10 µl of the sample was injected into the GC at an inlet temperature of 220° C. and was operated in a split mode (split flow of 12 mL/min, split ratio=10). Helium was used as a carrier gas with a constant flow rate of 1.2 mL/min. The temperature of the GC was held at 45° C. for 1 min, was then increased at a rate 10° C./min up to 300° C. and was held at this temperature for 1 min. The MS was used until the end of GC run with a solvent delay of 3.5 min. The ion source was maintained at a temperature of 250° C. and the MS was operated in scan mode. Anthracene-d10 was used as the internal standard as it is not present in the biomass samples. The standards of each compound were used to calculate the individual response factor.

III.5. Quantification: Calculation of Product Yield

Single-point calibration was used to calculate the response factor of the eluted compounds with respect to the internal standard (IS). Standards containing 2 mM of the compound and 20 µg of IS in 1 ml of Benzene were used for calibration. The area under the spectral peak of the compound and the IS were used to calculate the response factor (RF) (equation 1).

$$RF = \frac{Area_{compound}/\text{weight of the compound injected}}{Area_{IS}/\text{weight of } IS \text{ injected}} \quad (1)$$

The response factor was then used to calculate the actual concentration of the compounds in the sample. Area under the spectral peak of the compound and the IS for an actual sample are used to calculate the concentration of the compound in the injected volume of the sample.

$$\text{Weight of the compound in the injected sample} = \quad (2)$$
$$\frac{Area_{compound}}{Area_{IS}} \times \frac{\text{Weight of } IS}{RF}$$

RFs were determined independently for each standard using GC/Ms. The amount of each product was calculated as $$\frac{\text{Amount of Product } A \text{ in the Supernatant (g)}}{\text{Amount of the Starting Biomass (Kg)}} \quad (3)$$

III.6. Results and Discussion

III.6.1 Extraction of Lignin Byproducts from IL Pretreatment Using [$C_2$Mim][OAc]

Measured amounts of three different biomass types representing grasses, softwood and hardwood (switchgrass, pine, and eucalyptus respectively) and technical lignins (kraft and low sulfonate alkali) were treated with [$C_2$mim][OAc] at 160 and 120° C. for 6 hrs. Extraction solvents for non-polar products included pentane, hexane, heptane and benzene. Out of the solvents tried, benzene enabled the most recovery. Although yields were not the same using different solvents, patterns of lignin degradation and recovery were similar for all the solvents tested. Table 5 shows the percent biomass recovered for various types of biomass pretreated at 160° C. under different loading conditions. For all the conditions studied there is a loss of mass observed, indicating that a portion of lignin and other biomass constituents remain solubilized in the supernatant. At low biomass loading levels, low sulfonate alkali lignin showed the maximum solubilization, followed with switchgrass. Percent recoveries were found to be similar for kraft lignin and eucalyptus. Interestingly, at higher loadings, the extent of solubilization was found to vary and the observed extent of solubilization at 20% loadings were switchgrass=eucalyptus>pine dust=low sulfonate alkali>kraft lignin. In addition, similar extent of mass solubilization from technical lignin and lignocellulosic biomass indicates high levels of impurities (other material than lignin) present in the technical lignins we used.

III.6.2 Lignin Breakdown Products from Technical Lignins

Figure 1B:
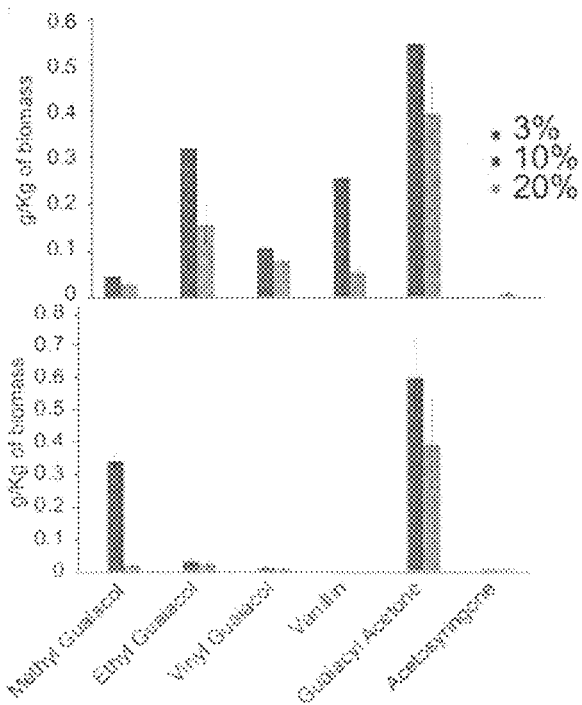
FIG. 1B depicts minor lignin breakdown products from kraft lignin (top panel) and low sulfonate alkali lignin (bottom panel) after dissolution at 160° C. for 6 hours with different biomass loading.

The non-polar lignin breakdown products extracted from the supernatant, along with their elution times during GC- MS, are shown in Table 6. The lignin breakdown products are observed to depend on the sample type and the dissolution temperature. For the technical lignins studied, guaiacol and allyl guaiacol were the major products at all biomass loadings (FIG. 1). Higher quantities of guaiacol (5 g/kg of biomass) were produced from kraft lignin when compared to low sulfonate alkali lignin. The quantity of

TABLE 5

Percent biomass recovered as a function of biomass loading during dissolution

| Biomass | Pretreatment Temperature | % Recovered |
|---|---|---|
| Kraft Lignin | 3% | 60 ± 2 |
|  | 10% | 69 ± 7 |
|  | 20% | 84 ± 4 |
| Low Sulfonate Alkali Lignin | 3% | 33 ± 1 |
|  | 10% | 43 ± 1 |
|  | 20% | 45 ± 3 |
| Switchgrass | Untreated | — |
|  | 3% | 40 ± 1 |
|  | 10% | 41 ± 4 |
|  | 20% | 35 ± 1 |
| Pine Dust | Untreated | — |
|  | 3% | 78 ± 5 |
|  | 10% | 56 ± 1 |
|  | 20% | 44 ± 5 |
| Eucalyptus | Untreated | — |
|  | 3% | 64 ± 1 |
|  | 10% | 58 ± 1 |
|  | 20% | 36 ± 1 | guaiacol produced (per kg of starting material) decreases as a function of increasing biomass loading. Higher quantities of ally guaiacol are produced from low sulfonate alkali lignin (2 g/kg) than from kraft lignin (1 g/kg). Other products like methyl guaiacol, ethyl guaiacol, vinyl guaiacol, vanillin, guaiacyl acetone are also present at smaller concentrations. Production of these minor products is observed to increase with increases in biomass loading from 3 wt % to 10 wt %, but is observed to decrease on further increasing the biomass loading to 20 wt %. Similar quantities of guaiacyl acetone are produced on dissolution of both kraft lignin and low sulfonate alkali lignin. Higher quantities of ethyl guaiacol, vinyl guaiacol and vanillin were produced from kraft lignin, whereas a higher quantity of methyl guaicol was obtained from low sulfonate alkali lignin. As these technical lignins were derived from softwood and contain very small quantities of S-lignin in the original feedstocks, syringyl compounds were not significant. Similar compounds were observed by Stark et al. from the oxidative depolymerization of beech lignin and by Reichert et al., on electrolysis oxidative cleavage of alkali lignin. Stark et al., ChemSusChem 2010, 3:719-23; Reichert et al., Phys Chem Chem Phys 2012, 14:5214-21.

TABLE 6

Non-Polar Lignin breakdown products found in the benzene extract of the supernatant

|  | Name | Compound | RT |
|---|---|---|---|
| 1 | Guaiacol |  | 8.8 |
| 2 | 4-Ethyl Guaiacol |  | 10.4 |
| 3 | 4-Vinyl Guaiacol |  | 11.1 |
| 4 | Eugenol |  | 11.61 |
| 5 | Syringol |  | 12.03 |
| 6 | 4-(1-propenyl) Guaiacol |  | 12.97 |
| 7 | Vanillin |  | 13.54 |
| 8 | Allyl Syringol |  | 14.49 |
| 9 | Guaiacylacetone |  | 14.14 |

TABLE 6-continued

Non-Polar Lignin breakdown products found in the benzene extract of the supernatant

| | Name | Compound | RT |
|---|---|---|---|
| 10 | Anthracene-$d_{10}$ | (structure) | 16.97 |

The acidic or basic dissolution conditions that may be involved during the dissolution of lignin in IL can be predicted based on the products formed after dissolution. Vanillin has been previously produced from alkaline treatment and nitrobenzene oxidation of kraft lignin. Adler et al. show the formation of guaiacol as a result of acidolysis of guaiacylglycerol-β-guaiacyl ether (Adler et al., Advances in Chemistry, A C S, 1966:22-35). They show that the guaiacol is the main product due to the cleavage of β-aryl ether linkages. Adler et al. also predict guaiacylacetone to be one of the products of lignin acidolysis, but this monomer was present in small quantities in our supernatant solutions. Formation of aldehyde derivatives (coniferaldehyde) like allyl guaiacol during acid pretreatment of lignin is well cited in the literature. Presence of higher quantities of guaiacol and allyl guaiacol indicated acidic dissolution conditions in IL under these conditions. The products identified here strongly confirm the dual acidic and basic behavior of [$C_2$mim][OAc].

III.6.3 Lignin Breakdown Products from Switchgrass

Figure 2A:
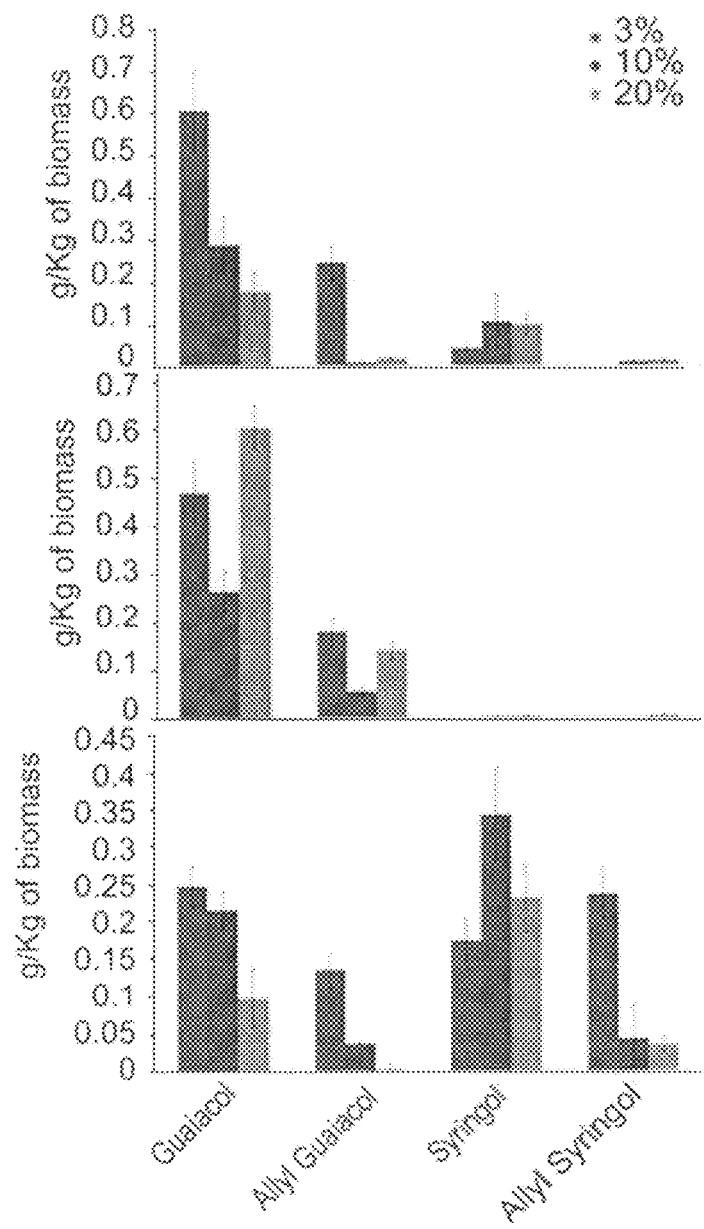
FIG. 2A depicts major lignin breakdown products from switchgrass (top panel), pine (middle panel), and eucalyptus (bottom panel) after dissolution at 160° C. for 6 hours with different biomass loading.
Figure 2B:
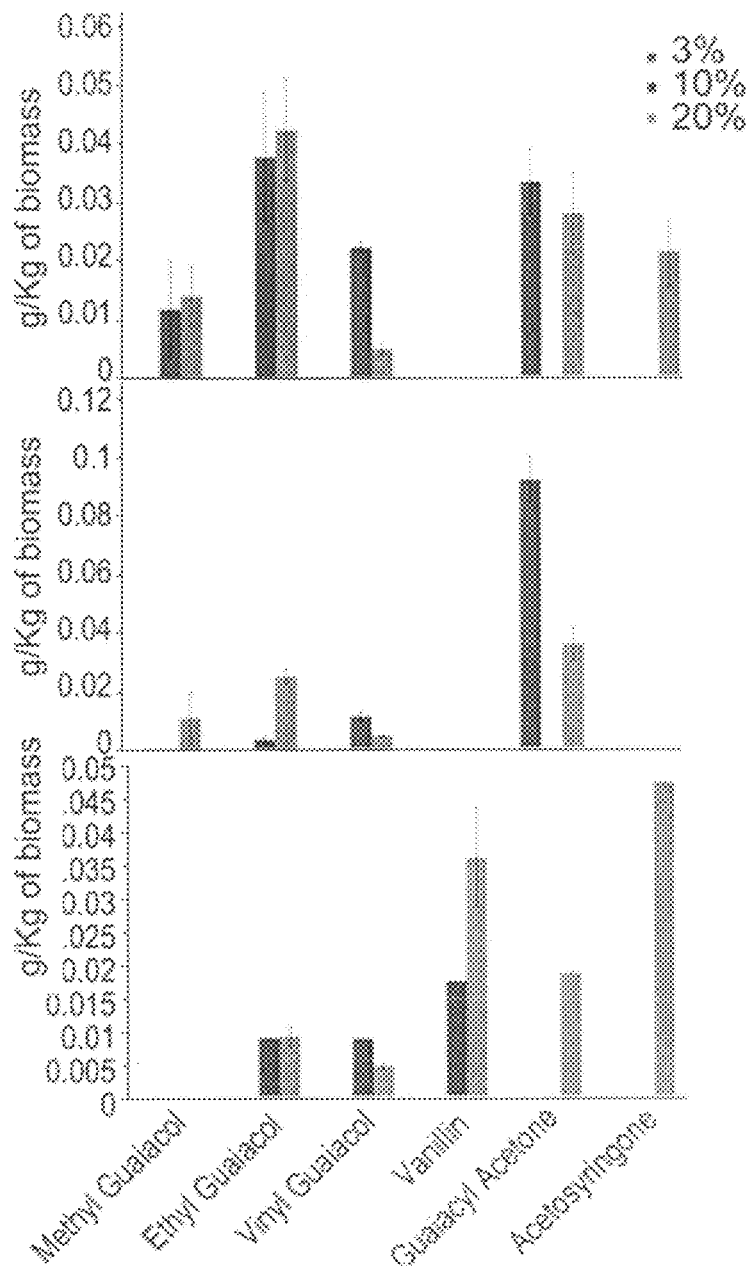
FIG. 2B depicts minor lignin breakdown products from switchgrass (top panel), pine (middle panel), and eucalyptus (bottom panel) after dissolution at 160° C. for 6 hours with different biomass loading.

The total amount of byproducts produced from lignocellulosic biomass was observed to be lower than that produced from technical lignins. This is reasonable given that lignin constitutes only ~⅓ of the dry weight of biomass. Guaiacol was obtained on dissolution of all lignocellulosic biomass in [$C_2$mim][OAc] at 160° C. for 6 hrs (FIG. 2). Allyl guaiacol and syringol are also produced by dissolution of switchgrass (FIG. 2A, top panel). As in the case of kraft lignin, the amount of guaiacol and allyl guaiacol produced decrease with increase in biomass loading. The production of syringol-type lignin compounds like syringol, allyl syringol and aceto syringone increases with increase in biomass loading. This increase implies breakdown of syringyl lignin increases with increase in biomass loading. All the minor products (methyl guaiacol, ethyl guaiacol, vinyl guaiacol, guaiacyl acetone and acetosyringone) except vanillin are produced on dissolution of switchgrass (FIG. 2B, top panel), and the amount of these products increases with biomass loading. The increase in production of these minor compounds and decrease in production of major compounds indicates incomplete breakdown of lignin with increase in biomass loading.

III.6.4 Lignin Breakdown Products from Pine

Guaiacol and allyl guaiacol were the only major products from dissolution of pine (FIG. 2A, middle panel). This is expected as pine consists of mostly guaiacyl lignin and has low (or no) syringyl lignin. In the case of pine, no correlation between the biomass loading and the total amount of guaiacol released was observed. The quantity of guaiacol and allyl guaiacol produced decreases on increasing the biomass loading from 3% to 10% and further increases on increasing the biomass loading to 20%. Methyl guaiacol, ethyl guaiacol, vinyl guaiacol and guaiacyl acetone are produced as minor products from pine (FIG. 2B, middle panel). The amount of guaiacyl acetone decreases with increase in biomass loading. At higher biomass loadings there is a small increase in the minor products generated.

III.6.5 Lignin Breakdown Products from Eucalyptus

Unlike pine, eucalyptus contains a higher amount of syringyl lignin than guaiacyl lignin and all major products (guaiacol, allyl guaiacol, syringol and allyl syringol) are produced (FIG. 2A, bottom panel). The amount of guaiacol and allyl guaiacol decreases with increases in biomass loading. The decrease in the production of these compounds indicated decrease in guaiacyl-lignin breakdown with increase in biomass loading. But the quantity of syringol produced increases on increasing the biomass loading from 3% to 10% and decreases on further increasing the biomass loading. Similar to dissolution of switchgrass, breakdown of guaiacyl-lignin decreases and syringyllignin increases with increase in biomass loading. At higher biomass loading levels of eucalyptus, increasing quantities of ethyl guaiacol, vanillin, guaiacyl acetone and acetosyringone were produced (FIG. 2B, bottom panel).

III.6.6 Temperature Dependence of Lignin Breakdown Products

As shown in the case of kraft lignin, changing the dissolution temperature changes the products that can be recovered from lignocellulosic biomass. A higher quantity of unsaturated guaiacols and aldehydes can be produced by decreasing dissolution temperature, and although not tested here, reaction time. It has been previously reported that vinyl guaiacol is produced from switchgrass when it is pretreated under alkaline conditions (Adler et al., Advances in Chemistry, A C S, 1966:22-35). It has also been reported in the literature that guaiacylacetone is produced under acidic treatment conditions (Adler et al., Advances in Chemistry, A C S, 1966:22-35). Guaiacol and syringol have been reported as the lignin products under acidic pretreatment conditions (Adler et al., Advances in Chemistry, A C S, 1966:22-35; Lai, Y.-Z, Wood and Cellulosic Chemistry, 2001:443-512).

Figure 3:
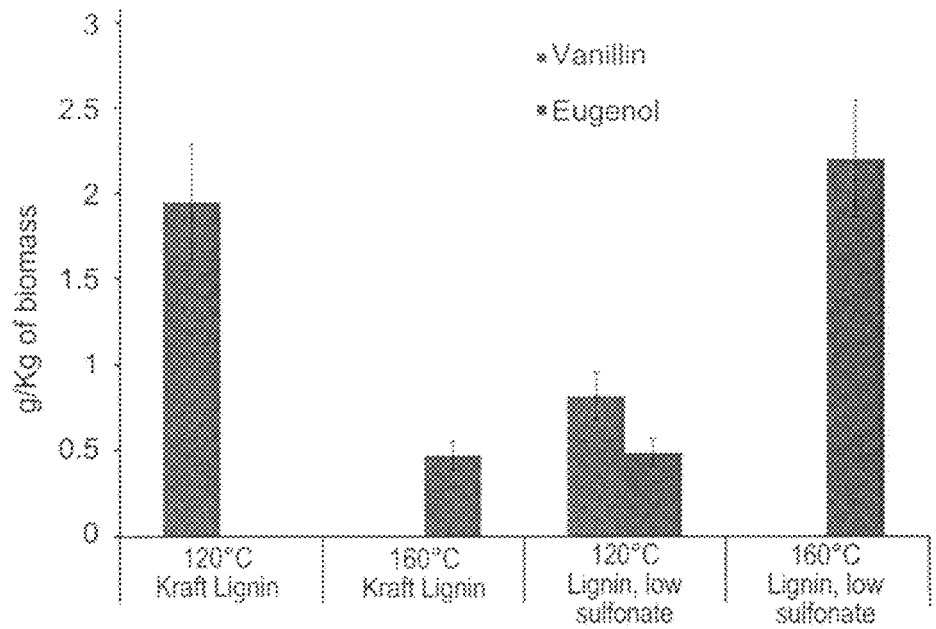
FIG. 3 depicts lignin breakdown products (vanillin and eugenol) from low sulfonate alkali lignin and Kraft lignin after dissolution at 120 and 160° C. for 6 hours at 3% biomass loading.

It is clear from the above discussions that the patterns of degradation products are very different from different biomass and also at different processing temperatures. Based on the final desired products, the dissolution conditions can be tuned to optimize the recovery of certain products. For example, the cleavage of the methyl ketone group from vanillin at higher temperature leads to guaiacol formation, and therefore if it is desired to generate more vanillin from biomass it can be obtained in higher quantities by lowering the process temperatures to 120° C. (FIG. 3). Similarly eugenol and vinyl guaiacol show the most dramatic impact of dissolution temperatures at the two temperatures studied. These examples provide evidence of a very flexible IL technology for lignin breakdown and product optimization. It is important to note that since the putative lignin glass transition temperature (polymeric lignin softens at broad temperature range instead of having a sharp melting point) is around 140-165° C. based on the source of lignin, it is expected that polymeric lignin will be increasingly depolymerized at higher temperatures. The unique characteristics of [C$_2$mim][OAc] induced behavior makes it a promising technology for the selective production of these chemicals while also serving as an efficient means of pretreating biomass (Varanasi et al., Bioresour Technol, 2012, 126:156-61).

III.7 Conclusion

In this study [C$_2$mim][OAc] was used to produce monomeric aromatic compounds from two types of technical lignins and three types of lignocellulosic biomass (pine, switchgrass, and eucalyptus) during pretreatment. Several guiacyl monomers were found to be present in the supernatant of technical lignins and biomass samples after dissolution in [C$_2$mim][OAc] at 160° C. for 6 hrs. Guaiacol was the common product from both technical lignins and biomass, and was produced at higher levels at 3% biomass loading. Higher biomass loadings did not generate more products per kg of starting material. Syringyl monomers were produced on dissolution of switchgrass and eucalyptus. Furthermore, the dissolution conditions can be changed to produce higher amount of the desired byproduct. The total amount of non-polar lignin products ranged from 0.5-5.7 g/kg of biomass. The amount of vanillin produced ranged from 0.04-2.0 g/kg of biomass under two processing temperatures tested. The products reported in this work only represent the nonpolar monomeric components that were soluble in benzene after dissolution. Polar lignin products are expected to be present in the supernatant and can also be extracted. These results indicate that certain ILs used for pretreatment may also hold significant promise in the conversion of polymeric lignin to smaller aromatics and desired renewable chemical outputs.

Example IV

The excellent lignin extraction and solvation properties of certain ionic liquids necessitate the subsequent recovery of the solutes. In addition, as with many solvents in industrial processes, recovery and reuse of the IL in an IL pretreatment process is desirable. The very properties which make ILs excellent solvents—i.e., thermal and chemical stability and excellent solvation properties—call for new systems to be developed for removal of the dissolved species and recycling of the ionic liquid. Established systems for removal and recycling, such as distillation, cannot be as readily used with thermally stable ILs as with low boing point organic solvents. Therefore solid-liquid separation systems have been proposed where, typically, water is employed as a precipitant for both the lignin and cellulose component. However, this solute removal system subsequently impacts the IL recycle unit operations, as the water needs to be removed from the IL. The use of water can impose both an energy and performance penalty on the IL pretreatment system.

Herein, we investigated the different chain-lengths of alcohols and IL pretreatment using 1-ethyl-3-methylimidazolium acetate ([C$_2$mim][OAc]) on lignin extraction efficacies and recycle of IL. The spent ionic liquid was reused four times to pretreat switchgrass. Pretreatment efficiency of recycled IL was probed by enzymatic hydrolysis and CP/MAS $^{13}$C NMR of pretreated biomass by recycled IL. $^{13}$C-$^1$H HSQC NMR was employed to probe changes in lignin interunit linkages and relative ratios of aromatic units on residual solids after enzymatic hydrolysis.

IV.1. Materials and Methods

Chemicals and Materials.

All chemicals were reagent grade and purchased from Sigma-Aldrich (St. Louis, Mo.), unless otherwise noted. 1-ethyl-3-methylimidazole acetate, [C$_2$mim][OAc], was purchased from BASF and used as received (batch # and purity). The *Trichoderma reesei* cellulase (Ctec 2) and hemicellulose (Htec 2) were given by Novozymes North America (Franklinton, N.C., USA), containing 188 and 186 mg protein/mL, respectively. Switchgrass (*Panicum virgatum*) was provided by Dr. Daniel Putnam, University of California at Davis. Switchgrass was Milled by a Wiley Mill through a 2 mm screen and separated by a vibratory sieve system (Endecotts, Ponte Vedra, Fla., USA).

Ionic Liquid (IL) Pretreatment.

Figure 4:
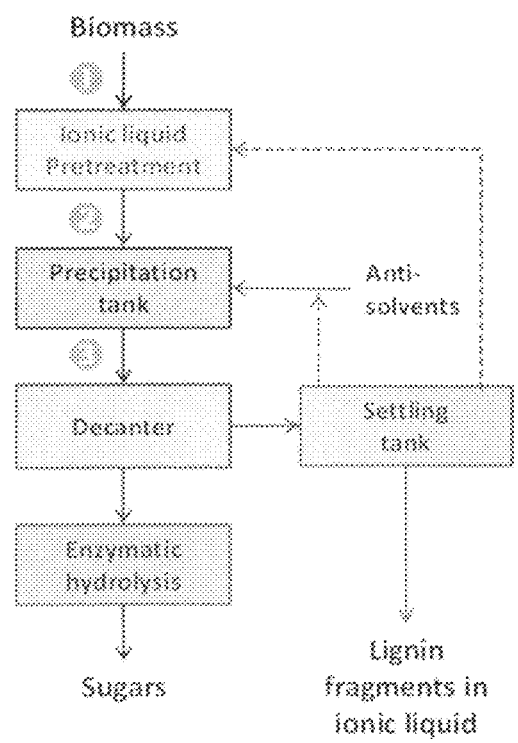
FIG. 4 depicts disruption of the lignocellulose chemical structure by ionic liquids and regeneration of dissolved lignocellulose in an anti-solvent. Partial lignin from lignocellulose can be fractionated from a mixture of ionic liquid and anti-solvent, enabling fractionation of lignin for downstream conversion to value-added products. The mixture of ionic liquid and anti-solvent can be separated and recycled. Regenerated lignocellulose was then hydrolyzed by cellulolytic enzymes to release sugars for downstream conversion to biofuels and/or biochemicals.

IL pretreatment of lignocellulose was conducted. Briefly, 15% (w/w) switchgrass in [C$_2$mim][OAc] was loaded in a Syrris globe reactor at 140° C. for 1.5 h, unless otherwise noted. The hydrogel-like solution was allowed to cool to 50° C., and two volumes of anti-solvents was added to solubilize partial lignin and precipitate dissolved switchgrass. After centrifugation, the supernatant was collected. An additional one volume of anti-solvent was then used to wash extract solubilized lignin from the pretreated switchgrass. After centrifugation, the pellets were washed by one volume of deionized water twice to remove residual [C$_2$mim][OAc] and anti-solvents from the solid pellets. The resulting solid pellets are called IL-pretreated switchgrass (IL-PSG) throughout and were used in the enzymatic hydrolysis experiments. FIG. 4 represents a schematic diagram of ionic liquid pretreatment, followed by an enzymatic hydrolysis in the present study.

Influence of alkyl chain length of alcohols on enzymatic hydrolysis characteristics of IL-PSG. Alcohols of different alkyl-chain lengths were used to in this study: methanol, ethanol, 1-propanol, 1-butanol, hexanol, 1-octanol, acetone, acetone-water (1:1), water, and isopropanol. These results allow us to correlate their lignin extraction and washing efficiencies with their enzymatic hydrolysis characteristics.

Carbohydrate and Lignin Assays.

The carbohydrate composition of lignocellulose and residual pretreated lignocellulose after hydrolysis was determined with a modified quantitative saccharification (QS) procedure [Moxley G, et al. 2007. Energy Fuels 21:3684-3688]. In the modified QS, secondary hydrolysis was conducted in the presence of 1% (w/w) sulfuric acid at 121° C. for 1 h to more accurately determine the quantities of sugars susceptible to acid degradation (e.g., xylan). Monomeric sugars in the supernatant were measured with an Agilent HPLC equipped with a Bio-Rad Aminex HPX-87H column (Richmond, Calif.) at a rate of 0.6 mL of 0.1% (v/v) sulfuric acid per min at 60° C. The standard NREL biomass protocol was used to measure lignin and ash Sluiter A, et al. 2011. "Determination of structural carbohydrates and lignin in biomass. Laboratory Analytical Procedure (LAP)." *Technical Report. NREL/TP*-510-42618]. Briefly, solids remaining after two-stage acid hydrolysis were held at 105° C. overnight. The mass of the dried solids corresponds to the amount of acid-insoluble lignin and ash in the sample. The mass of the ash only fraction was then determined by heating the solids to 575° C. for 24 h. Percent acid-soluble lignin in the sample was determined by measuring the UV absorption of the acid hydrolysis supernatant at 240 nm. All carbohydrate and lignin assays were conducted in triplicate.

Enzymatic Hydrolysis.

The pretreated samples were diluted to 100 g solid per liter in a 50 mM sodium citrate buffer (pH 4.8) supplemented with 0.1% (w/v) $NaN_3$, which prevented the growth of microorganisms. All enzymatic hydrolysis experiments were conducted in triplicate. Pretreated samples were completely suspended in a rotary shaker at 250 rpm at 50° C. The enzyme loadings were kept constant at 20 and 5 mg protein per gram of glucan (initial glucan) using commercial Ctec2 and Htec 2 (9:1 bp weight). Eight hundred microliters of well-mixed hydrolysate were removed, followed by immediate centrifugation at 13,000 rpm for 5 min. Exactly 500 µl, of the supernatant was transferred to another micro-centrifuge tube and stayed at room temperature for 30 min, to allow the conversion of all cellobiose to glucose. The supernatant was then acidified by adding 30 µL of 10% (w/w) sulfuric acid, followed by freezing overnight. The frozen samples were thawed, mixed well, and then centrifuged at 13,000 rpm for 5 min, to remove any precipitated solid sediments. The soluble glucose and xylose in the enzymatic hydrolysate were measured by HPLC equipped with a Bio-Rad HPX-87H column at a rate of 0.6 mL of 0.1% (v/v) sulfuric acid per min at 60° C. Galactose and mannose co-eluted with xylose. After 72 h hydrolysis, the remaining hydrolysate was transferred to a 50 mL centrifuge tube, centrifuged at 4500 rpm for 15 min, and soluble sugar content was determined using the same procedure as other hydrolysate samples, as described above. After all remaining hydrolysate was decanted, the pellets were resuspended in 30 mL of water and centrifuged to remove residual soluble sugars from the pellets. The sugar content of the washed pellets was determined by modified QS as described above. Enzymatic glucan digestibility after 72 h was calculated using the ratio of soluble glucose in the supernatant to the sum of this soluble glucose and the glucose equivalent of the residual glucan.

Isolation of enzymatic mild acidolysis lignin (EMAL). Ball-milling of biomass was performed using a Retsch PM 100 planetary ball mill spinning at 600 rpm with zirconium dioxide ($ZrO_2$) container and balls. The ball milling conditions were described elsewhere [Kim H, et al. 2010. *Org. Biomol. Chem.* 8:576-591]. Briefly, the ball-milled biomass samples were treated with cellulase (Ctec 2) and hemicellulase (Htec 2) in the amount of 50 mg protein/g biomass. The enzymatic hydrolysis was carried out at 50° C. for 48 h at 2% consistency in the presence of 2% Tween 20 in 50 mM citrate buffer (pH ~4.8). The insoluble materials were washed with deionized water and a fresh batch of enzymes, in the same quantity, was added for another 48 h. The insoluble materials remaining after enzymatic hydrolysis were washed with deionized water to remove soluble sugars. Residual proteins on the surface of solid pellets were then washed twice with 6 M guanidine hydrochloride (Gnd HCl) and freeze dried. The crude lignin obtained was further subjected to mild acid hydrolysis using an azeotrope of dioxane-water (96:4 (v/v)) containing 0.01 N HCl under nitrogen atmosphere. The resulting suspension was centrifuged, and the supernatant was collected. The supernatant was neutralized with 2 M sodium bicarbonate and then added drop-wise into 1 L acidified water (pH 2.0). The precipitated lignin was allowed to equilibrate overnight, recovered by centrifugation, washed with deionized water twice, and freeze dried.

Gel permeation chromatography (GPC). Lignin solution, 1% (w/v) EMAL of switchgrass, was prepared in analytical-grade 1-methyl-2-pyrrolidinone (NMP). Streams $L_2$ and $L_3$ were analyzed by taking a minute amount of $L_2$ and $L_3$ aliquots in 200 uL NMP. The polydispersity of dissolved lignin was determined using analytical techniques involving GPC UV-A absorbance (GPC UV-$A_{290}$) as previously described [George A, et al. 2011. *Green Chem.* 13:3375-3385]. An Agilent 1200 series binary LC system (G1312B) equipped with DA (G1315D) detector was used. Separation was achieved with a Mixed-D column (5 µm particle size, 300 mm×7.5 mm i.d., linear molecular mass range of 200 to 400,000 u, Polymer Laboratories) at 80° C. using a mobile phase of NMP at a flow rate of 0.5 mL per min. Absorbance of materials eluting from the column was detected at 300 nm (UV-A). Intensities were area normalized and molecular mass estimates were determined after calibration of the system with polystyrene standards. Polystyrene does not represent the geometry of the lignin molecule, based on current knowledge, but is the currently used standard for GPC calibration in the literature. Polystyrene calibrations were conducted here to confirm correct GPC system behavior and so that the data presented in this study may be compared to other published data using similar GPC systems and methods.

2D $^{13}C$-$^1H$ heteronuclear single quantum coherence (HSQC) NMR spectroscopy. Residual solids after enzymatic hydrolysis was ball milled as previously described [Kim et al. 2010, supra; Mansfield S. Dak., et al. 2012. *Nat. Protoc.* 7:1579-158]. The gels were formed using DMSO-$d_6$ and pyridine-$d_5$ and sonicated until homogenous in a Branson 2510 table-top cleaner (Branson Ultrasonic Corporation, Danbury, Conn.). The temperature of the bath was closely monitored and maintained below 55° C. The homogeneous solutions were transferred to NMR tubes. HSQC spectra were acquired at 25° C. using a Bruker Avance-600 MHz instrument equipped with a 5 mm inverse-gradient $^1H/^{13}C$ cryoprobe using a q_hsqcetgp pulse program (ns=200, ds=16, number of increments=256, $d_1$=1.0 s)[Heikkinen S, et al. 2003. *Journal of the American Chemical Society* 125:4362-4367]. Chemical shifts were referenced to the central DMSO peak ($\delta_C/\delta_H$ 39.5/2.5 ppm). Assignment of the HSQC spectra was described elsewhere [Kim et al. 2010, supra; Yelle D J, et al. 2008. *Magn. Reson. Chem.* 46:508-517]. A semi-quantitative analysis of the volume integrals of the HSQC correlation peaks was performed using Bruker's Topspin 3.1 (Windows) processing software. A Guassian apodization in $F_2$ (LB=-0.50, GB=0.001) and squared cosine-bell in $F_1$ (LB=-0.10, GB=0.001) were applied prior to 2D Fourier Transformation.

Solid State NMR (ssNMR).

The cross-polarization magic-angle spinning (CP/MAS) $^{13}C$-NMR spectra of all samples were obtained on a Bruker II Avance-500 spectrometer operating at the resonance frequencies of 500.23 MHz for $^1H$, and 125.80 MHz for $^{13}C$, using a Bruker 4.0 mm Broad Band CP-MAS probe spinning at 5 kHz. Cross-polarization for 1 ms mixing time was achieved at 50 kHz rf-field at the $^1H$ channel and linearly ramping the $^{13}C$ rf-field over a 25% range centered at 38 kHz. Total accumulation time was 8 min (1400 transient signals) by using 63 kHz of two-pulse phase modulated proton decoupling technique (Bennett et al., 1995). All spectra were collected at room temperature with glycine as an internal standard. According to the $C_4$ peak-deconvolution method, the CrI value was calculated from the ratio of the crystalline area over the total area, where separation of crystalline ($\delta_{86-92\ ppm}$) and amorphous ($\delta_{79-86\ ppm}$) fractions were based on Guassian line shape function.

Fourier Transform Infrared Spectroscopy (FTIR).

All FTIR spectra were collected on the Thermo Nicolet 8700 spectrometer equipped with Attenuated total reflectance (ATR) mode (Thermo Fisher Scientific Inc., USA). Sixty scans at a resolution of 4/cm were averaged for each sample. A background was collected prior to analyzing each sample and subtracted from each spectrum. Spectra width is 4000-600 cm$^{-1}$. All the spectra are auto-baseline corrected using the Omnic software.

IV.2. Results and Discussion

Figure 5A:
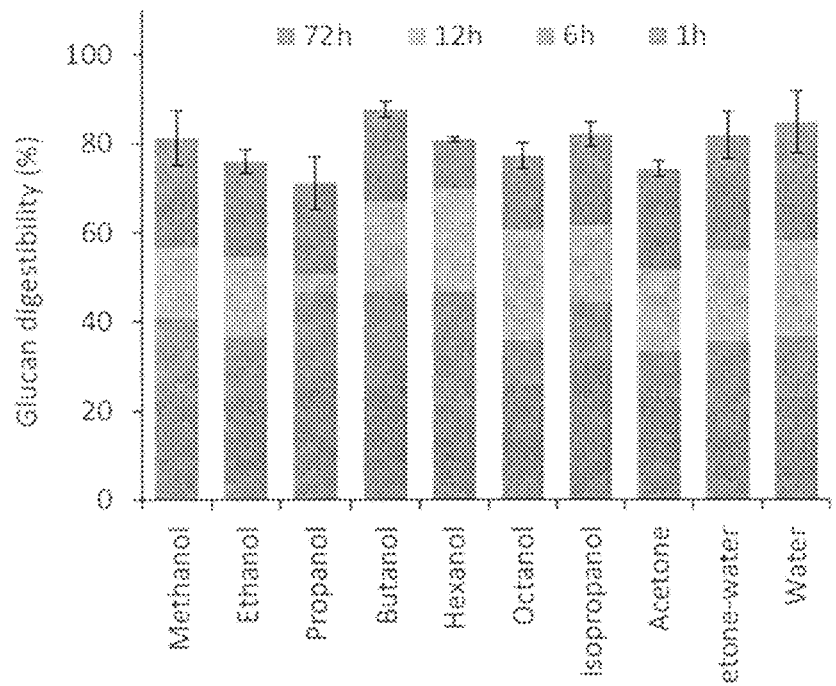
FIG. 5A shows the enzymatic hydrolysis profiles of IL-pretreated switchgrass samples using different alcohols as anti-solvents and an enzyme loading 5 mg protein/g glucan. The hydrolysis profiles indicated high glucan digestibilities, and using different anti-solvents did not show statistically significant differences in glucan digestibilities.
Figure 5B:
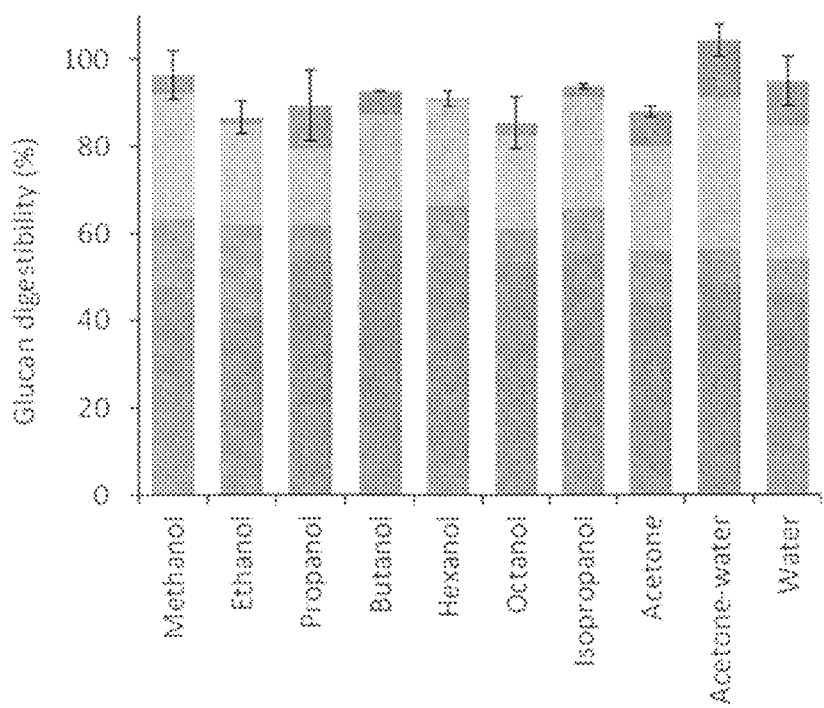
FIG. 5B shows the enzymatic hydrolysis profiles of IL-pretreated switchgrass samples using different alcohols as anti-solvents an enzyme loading of 20 mg protein/g glucan. Faster initial hydrolysis rates (1 h hydrolysis time) and higher glucan digestibilities resulted from the higher enzyme loading.

IV.2.1. Influence of Alkyl-Chain Lengths of Alcohols on IL-PSG Characteristics and their Enzymatic Hydrolysis Efficiencies Switchgrass samples of 2 mm particle size were pretreated by [C$_2$mim][OAc]. After IL pretreatment, an anti-solvent was added to precipitate dissolved switchgrass samples. A number of alcohols of different alkyl-chain lengths were evaluated as anti-solvents—methanol, ethanol, 1-propanol, 1-butanol, 1-hexanol, and 1-octanol. Water, 2-propanol, acetone, and acetone-water (50/50) were also used for comparison as these anti-solvents were previously reported. An increase in hydrophobicity of alcohols was observed as a function of chain-lengths. IL-pretreated switchgrass (IL-PSG) samples from different anti-solvents were hydrolyzed by Ctec 2 and Htec 2 at 5 and 20 mg protein per gram of glucan. At a low enzyme loading of 5 mg protein per gram of glucan, enzymatic glucan digestibility yields of IL-PSG were higher than 78%, regardless of anti-solvents used (FIG. 5A). An increase in an enzyme loading to 20 mg protein per gram glucan showed a faster initial hydrolysis rate, as reflected in more than two-fold increase in glucan digestibilities within one hour hydrolysis time. All enzymatic hydrolysis reactions at 20 mg protein per gram of glucan yielded higher than 90% glucan digestibility (FIG. 5B), regardless of the choice of an anti-solvent. These results suggested the high biomass pretreatment efficiency by IL under the current pretreatment condition, as shown in high glucan digestibilities of IL-PSG even at a four-fold decrease in enzyme loading.

IV.2.2. Lignin Elution Characteristics after IL Pretreatment

Most current pretreatment studies focus on lowering degree of lignocellulose recalcitrance to enhance enzymatic glucan digestibility. Herein, we investigated how lignin biopolymers behave after IL pretreatment. As shown in FIG. 4, lignin from lignocellulose could partition into IL, as IL ([C$_2$mim][OAc] in this study) has been shown to be effective not only at pretreating lignocellulose and also partially solubilize lignin [Sathitsuksanoh N, et al. 2014. *Green Chem.* 16:1236-1247]. Previously, hydrolysis of a part of lignin within lignocellulose during pretreatment was observed and some small lignin fragments were detected in IL. [Varanasi et al. 2013. Biotechnol. Biofuels 6(1):14] Without wishing to be bound by any particular theory, it is believed that different anti-solvents influenced lignin elution profiles without differentially affecting enzymatic hydrolysis performance of IL-PSG.

Figure 6:
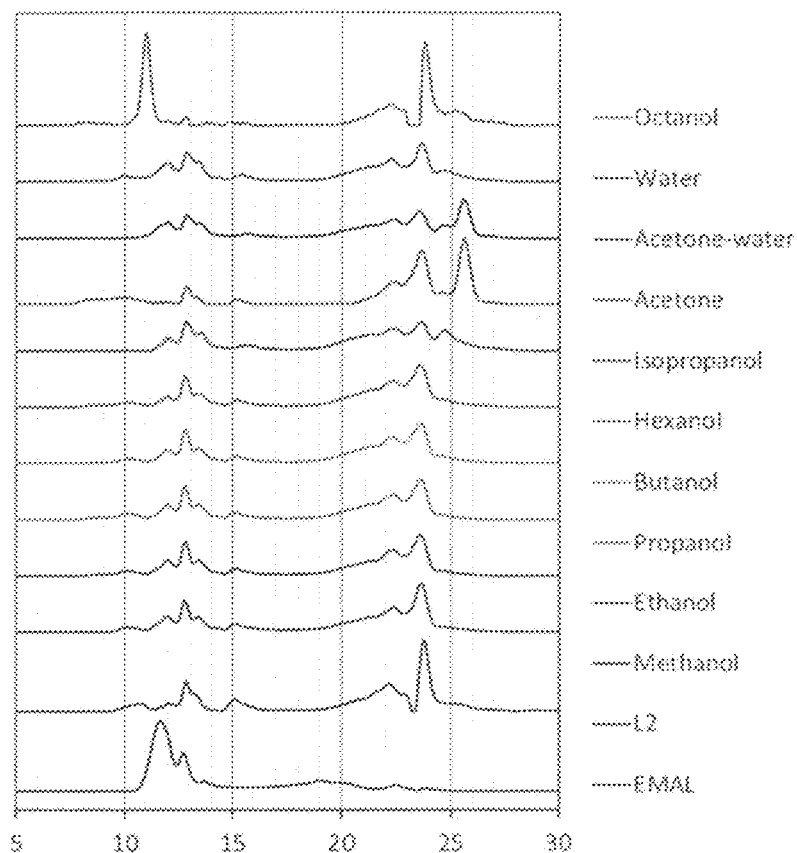
FIG. 6 shows GPC elution profiles of extracted lignin in the IL before and after addition of different anti-solvents revealed lignin depolymerization during IL pretreatment.

Molecular weight distribution (MWD) of lignin in different anti-solvents was evaluated by GPC. EMAL of SG was used as a control and the GPC chromatogram of EMAL of SG showed a bi-modal distribution (FIG. 6), suggesting that EMAL of SG (stream L$_1$, FIG. 4) consists of mainly high molecular weight lignin fragments with a trace amount of low molecular weight lignin fragments. After IL pretreatment (stream L$_2$, FIG. 4), partial lignin was hydrolyzed as shown in polydispersed characteristic of L$_2$ (FIG. 6). An Addition of the anti-solvents in the pretreatment slurry (stream L$_3$, FIG. 4) showed similar molecular weight distribution as L$_2$, which was because most of these anti-solvents in this study is miscible with IL except 1-hexanol and 1-octanol (partially miscible). Interestingly, in the case of L$_3$ of 1-octanol, a strong signal was observed in both excluded and retained regions, implying that both high and low molecular weight lignin fragments migrated to octanol. These findings give rise to the potential use of octanol, if both large and small molecular weight lignin fragments were desired.

IV.2.3. Enzymatic Hydrolysis Efficiency of IL-PSG by Recycled IL

Figure 7:
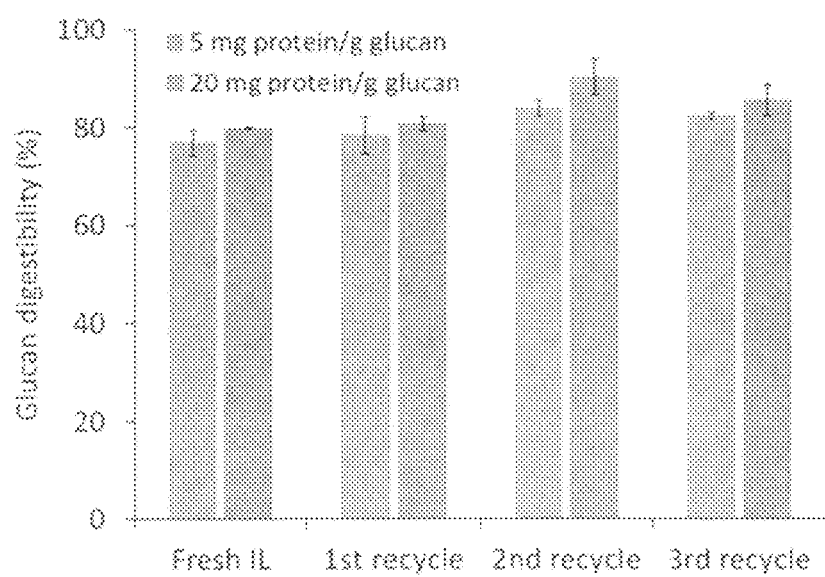
FIG. 7 shows that the use of recycled IL for pretreatment of switchgrass resulted in no decrease in the glucan digestibility of pretreated switchgrass. Left bars: 5 mg protein/g glucan; Right bars; 10 mg protein/g glucan.

One of the major challenges in IL pretreatment is the recycle of ionic liquids. IL recycle is a difficult task, as most anti-solvents are miscible with IL. We found that for IL-octanol solution after pretreatment, adding 10% water was found to create a meniscus between octanol and IL, enabling a multiphase separation and IL recycle. Consequently, octanol and IL phases were reused for three subsequent IL pretreatments. Octanol was observed to be darker in color following each recycle, which might be due to migration of lignin fragments into the octanol phase, corroborating with a strong signal of lignin elution profiles by GPC. IL-PSG samples by 1$^{st}$, 2$^{nd}$, and 3$^{rd}$ recycled IL were enzymatically hydrolyzed and the enzymatic saccharification efficiencies were similar to that of fresh IL (FIG. 7), suggesting a good recycling efficiency of IL-octanol system.

Figure 8A:
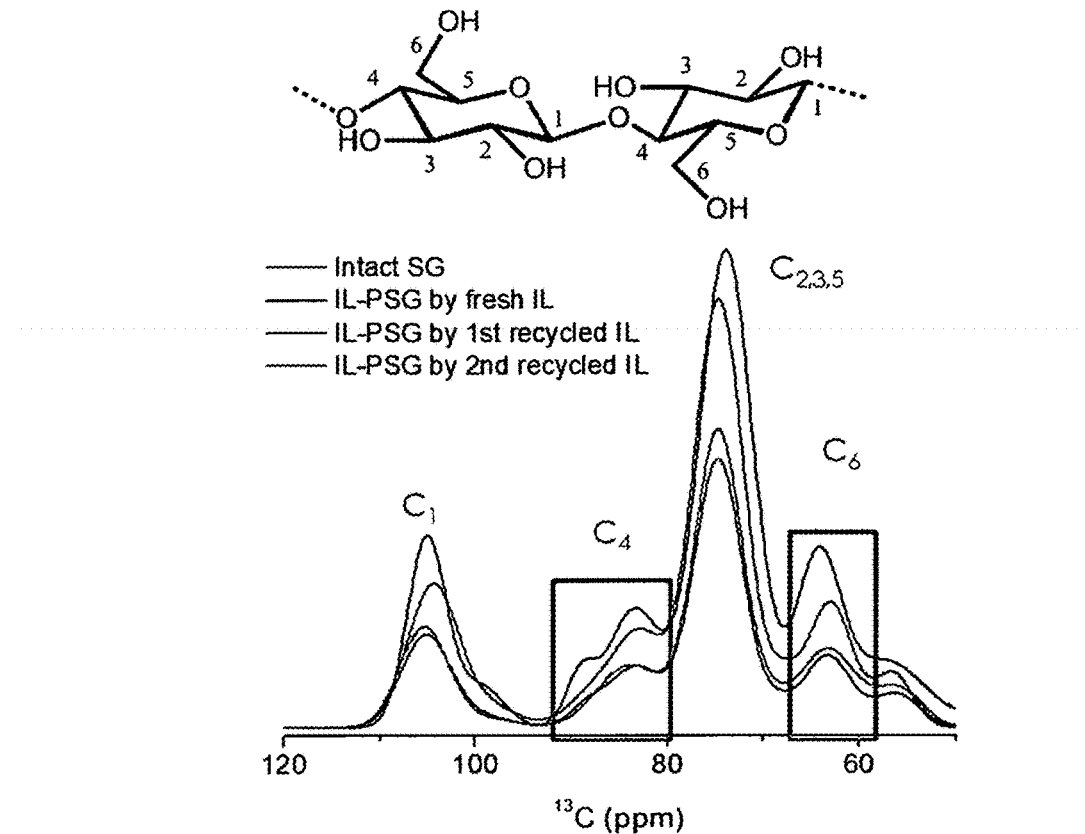
FIG. 8A shows the full cross-polarization magic-angle spinning (CP/MAS) $^{13}$C NMR spectra ($\delta_{120\text{-}50}$) for intact switchgrass (SG) and ionic liquid-pretreated switchgrass (IL-PSG) with fresh and recycled IL, indicating that recycled IL can effectively pretreat biomass.
Figure 8B:
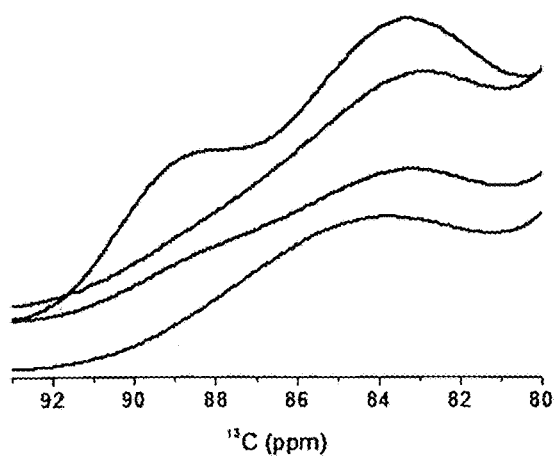
FIG. 8B shows the the $C_4$ region ($\delta_{94\text{-}80}$) of the CP/MAS $^{13}$C NMR spectra for intact switchgrass (SG) and ionic liquid-pretreated switchgrass (IL-PSG) with fresh and recycled IL, indicating that recycled IL can effectively pretreat biomass.
Figure 8C:
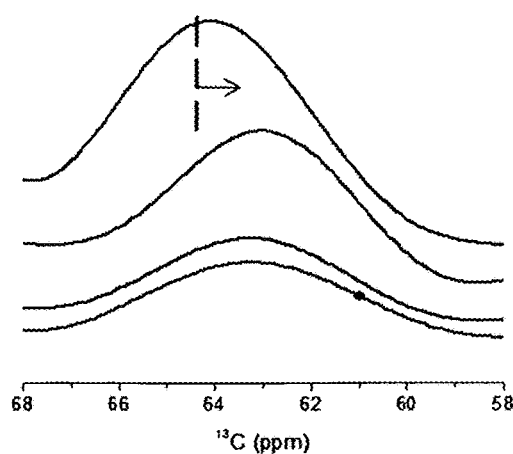
FIG. 8C shows the $C_6$ region ($\delta_{68\text{-}58}$) of the CP/MAS $^{13}$C NMR spectra for intact switchgrass (SG) and ionic liquid-pretreated switchgrass (IL-PSG) with fresh and recycled IL, indicating that recycled IL can effectively pretreat biomass.

IV.2.4. Structural Characteristics of IL-PSG by Recycled IL Via Solid State NMR and FTIR CP/MAS $^{13}$C NMR spectroscopy is a useful tool to analyze breaking and rearranging of hydrogen bonding of cellulose chains. C$_4$ and C$_6$ regions of CP/MAS $^{13}$C NMR spectra of lignocellulose reveal state of cellulose crystallinity and hydrogen bonding among cellulose chains, respectively Park S, et al. 2010. *Biotechnol Biofuels* 3:10; Park S, et al. 2009. *Cellulose* 16:641-647]. C$_4$ peak deconvolution was applied to separate the contribution of crystalline and amorphous cellulose on intact SG sample (FIG. 8B) and crystallinity index (CrI) was calculated as previously described [Sathitsuksanoh N, et al. 2011. *Biotechnol. Bioeng.* 108]. CrI of intact SG was found to be ~38%, which is in agreement with the previous reported value suggesting a robustness of this CrI calculation method. The IL-PSG samples by fresh and recycled IL were probed by CP/MAS $^{13}$C NMR. PSG were lyophilized prior to CP/MAS $^{13}$C NMR analysis. CrI of IL-PSG samples were 15.9, 12.1, and 14.0% for IL-PSG by fresh and 1$^{st}$ and 2$^{nd}$ (round) recycled IL, respectively. Moreover, the peak shift in the C$_6$ region (FIG. 8C) to the higher field after pretreatment by the recycled IL implied that both fresh and recycled IL could effectively disrupt hydrogen bonding among cellulose chains of switchgrass. These results suggest that recycled IL from the [C$_2$mim][OAc]-octanol system still retains pretreatment efficacy similar to the fresh IL.

Figure 8D:
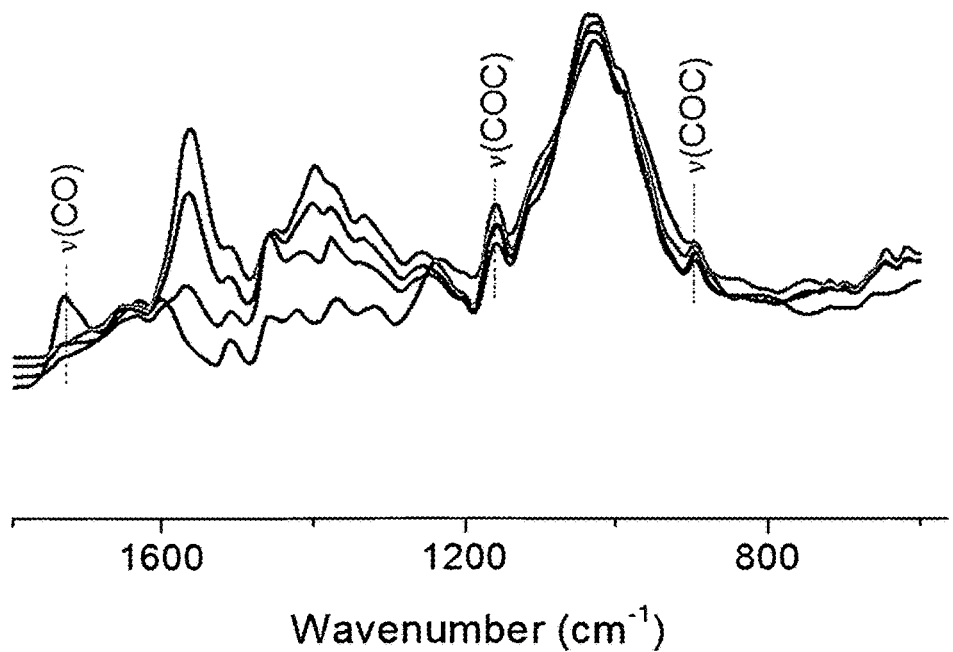
FIG. 8D shows the fingerprint region of FTIR of intact SG and IL-PSG by fresh and recycled IL.
Figure 11:
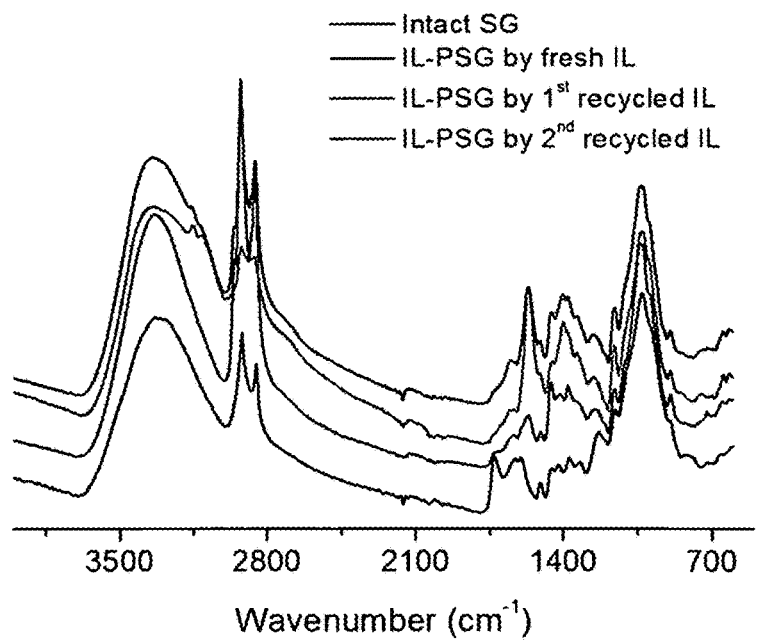
FIG. 11 shows full FTIR spectra of intact SG, IL-PSG by fresh IL and $1^{st}$ and $2^{nd}$ recycled ILs.

Full FTIR spectra of intact SG, IL-PSG by fresh IL and 1$^{st}$ and 2$^{nd}$ recycled IL are shown in FIG. 11. Changes in the FTIR spectra of IL-PSG by fresh IL compared to that of intact SG were observed in the fingerprint region (FIG. 8D). A decrease in the spectral intensity at 1730 cm$^{-1}$ (v(C=O), carbonyl stretching), suggesting that acetylated groups from hemicelluloses were removed as a result of IL pretreatment.

Moreover, enhanced band intensities at 897 ($v_{as}$(ring), anomeric vibration at β-glycosidic linkages) and 1159 cm$^{-1}$ ($v_{as}$(COC), COC antisymmetric stretching) of IL-PSG by fresh and recycled IL compared to that of intact SG, suggesting that IL-PSG samples were more disordered (amorphous) and IL could be reused many times (3 times in the present study) without rendering its pretreatment efficiency.

Figure 9A:
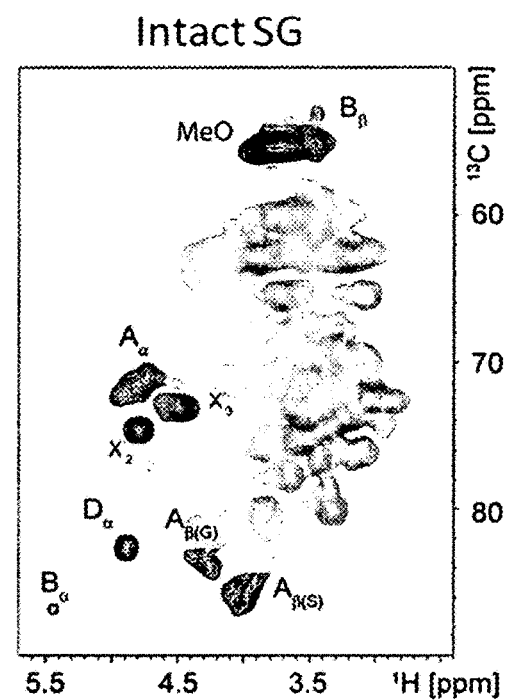
FIG. 9A shows the aliphatic region of a 2D $^{13}$C-$^{1}$H heteronuclear single quantum coherence ($^{13}$C-$^{1}$H HSQC) NMR spectrum of intact switchgrass, indicating that lignin structural integrity is maintained in the residual solids.
Figure 9B:
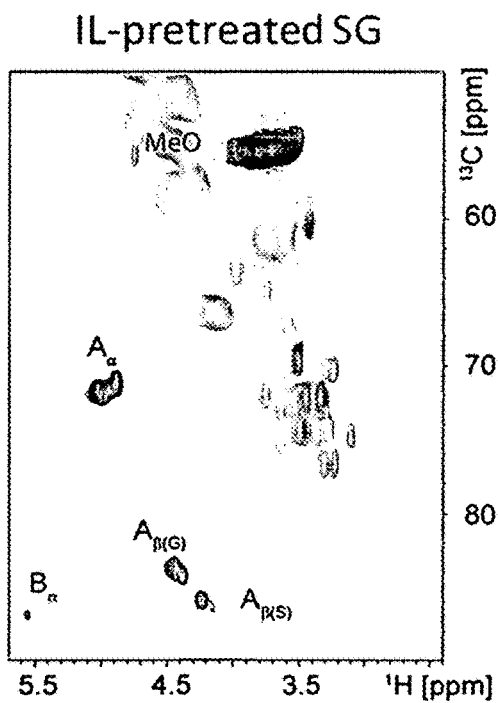
FIG. 9B shows the aliphatic region of a $^{13}$C-$^{1}$H HSQC NMR spectrum of IL-pretreated switchrass, indicating that lignin structural integrity is maintained in the residual solids.
Figure 9C:
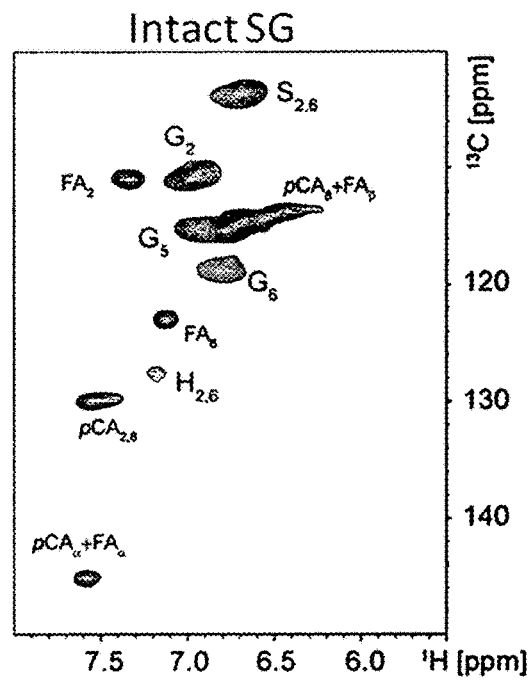
FIG. 9C shows the aromatic region of a $^{13}$C-$^{1}$H HSQC NMR spectrum of intact switchrass, indicating that lignin structural integrity is maintained in the residual solids.
Figure 9D:
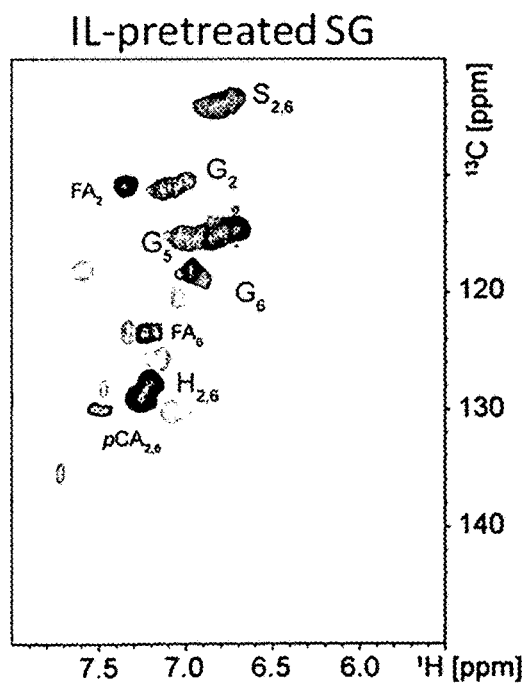
FIG. 9D shows the aromatic region of a $^{13}$C-$^{1}$H HSQC NMR spectrum of IL-pretreated switchrass, indicating that lignin structural integrity is maintained in the residual solids.
Figure 9E:
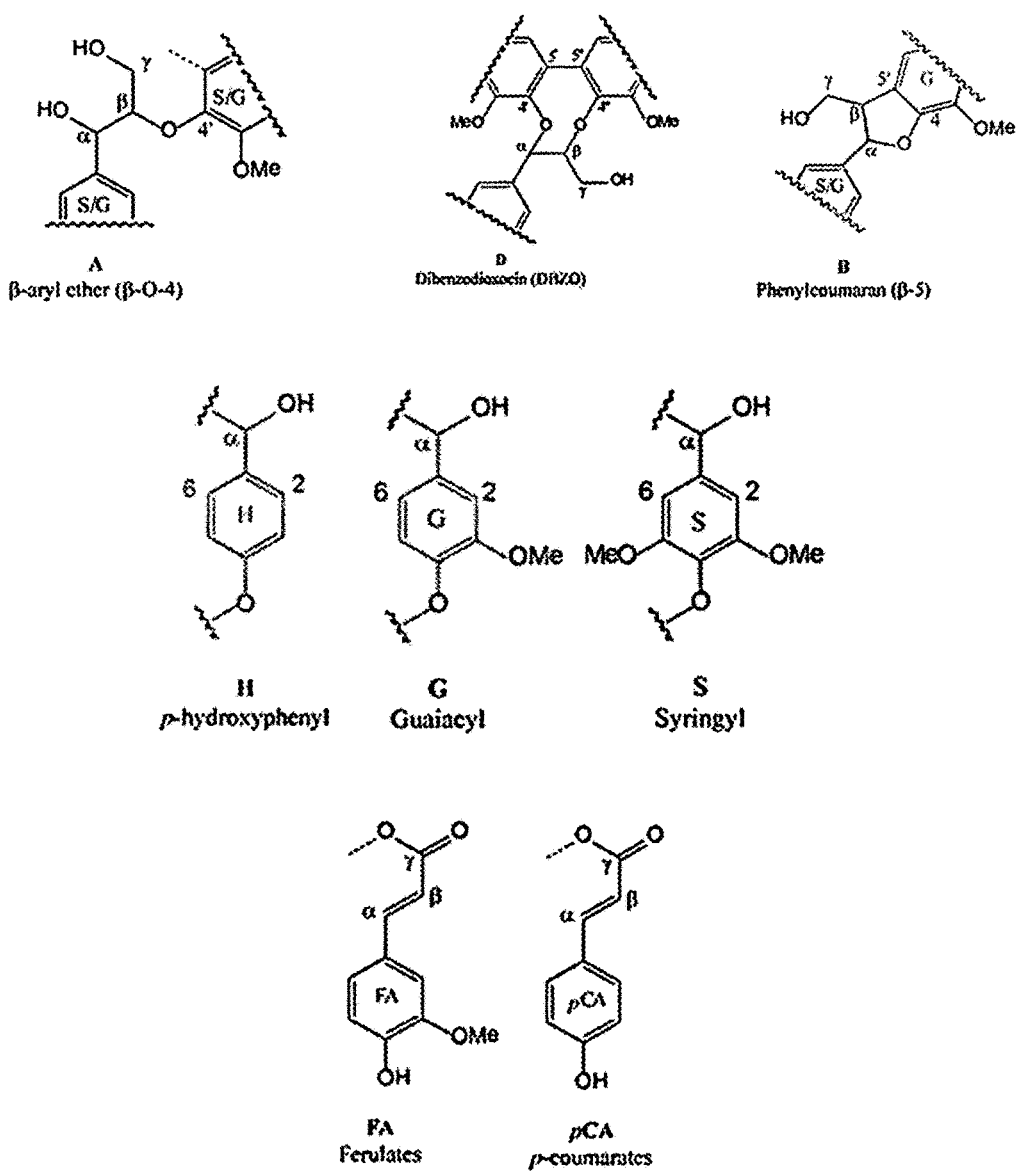
FIG. 9E shows the structural features giving rise to the $^{13}$C-$^{1}$H HSQC NMR signals.
Figure 10:
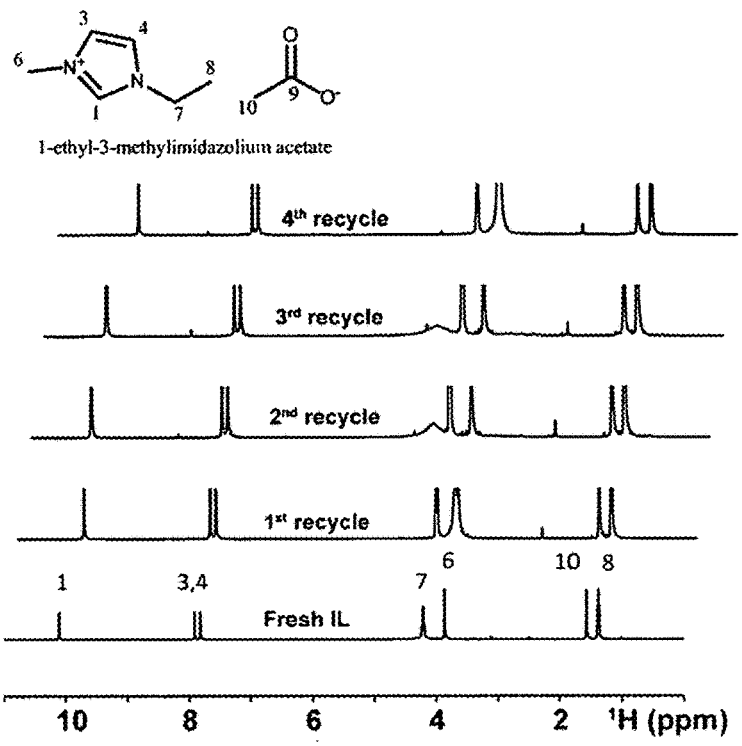
FIG. 10 shows $^{1}$H NMR spectra of fresh and recycled ILs.

IV.2.5. Chemical Structure Characteristics of Lignin from IL-PSG Post Enzymatic Hydrolysis Via 2D NMR $^{13}$C-$^{1}$H HSQC NMR was performed to investigate changes of aliphatic (lignin sidechain units, FIG. 9A-B) and aromatic (FIG. 9C-D) regions of intact SG and IL-PSG samples post enzymatic hydrolysis by fresh and recycled IL. Aliphatic regions of intact SG exhibited two distinct peaks of 2-O-Ac-β-D-Xylp(R) (X'$_2$) and 3-O-Ac-β-D-Xylp(R) (X'$_3$), suggesting acetylation of hemicelluloses in the intact SG. Moreover, lignin of intact SG consists mainly of β-aryl ether (β-O-4), resinol (β-5), and dibenzodioxocins. After IL pretreatment, diobenzodioxocins were not observed in IL-PSG samples. Dibenzodioxocins are believed to be branching points of lignin. Hence, an absence of dibenzodioxocins after IL pretreatment suggested that lignin was depolymerized due to IL pretreatment, corroborating with the presence of lignin fragments in the L$_2$ and L$_3$ stream by GPC (FIG. 6). Moreover, X'$_2$ and X'$_3$ disappeared after IL pretreatment and subsequent enzymatic hydrolysis, suggesting that a large amount of hemicelluloses were removed after enzymatic hydrolysis.

Figure 12A:
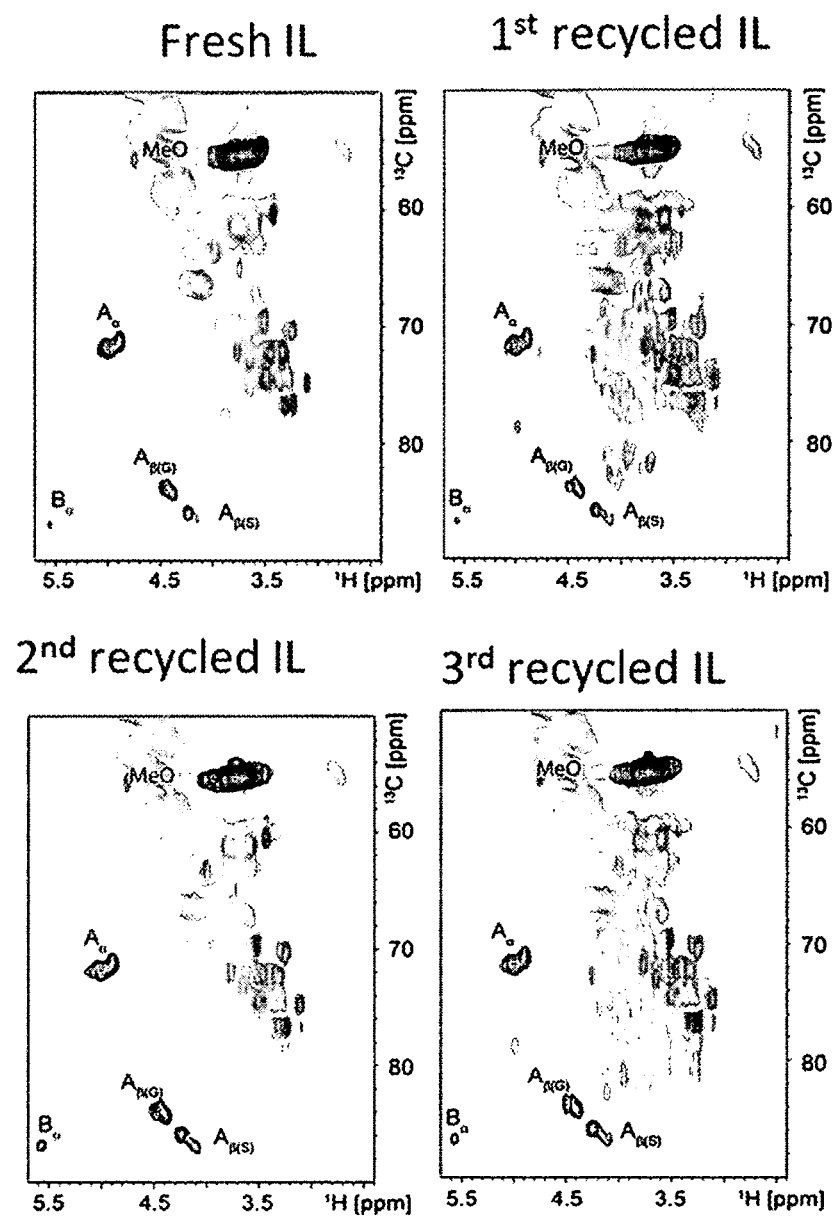
FIG. 12A shows the aliphatic region of $^{13}$C-$^{1}$H HSQC NMR spectra of residual solids post enzymatic hydrolysis of IL-PSG by fresh IL and $1^{st}$, $2^{nd}$, and $3^{rd}$ recycled IL, indicating that lignin structural integrity is maintained in the residual solids.
Figure 12B:
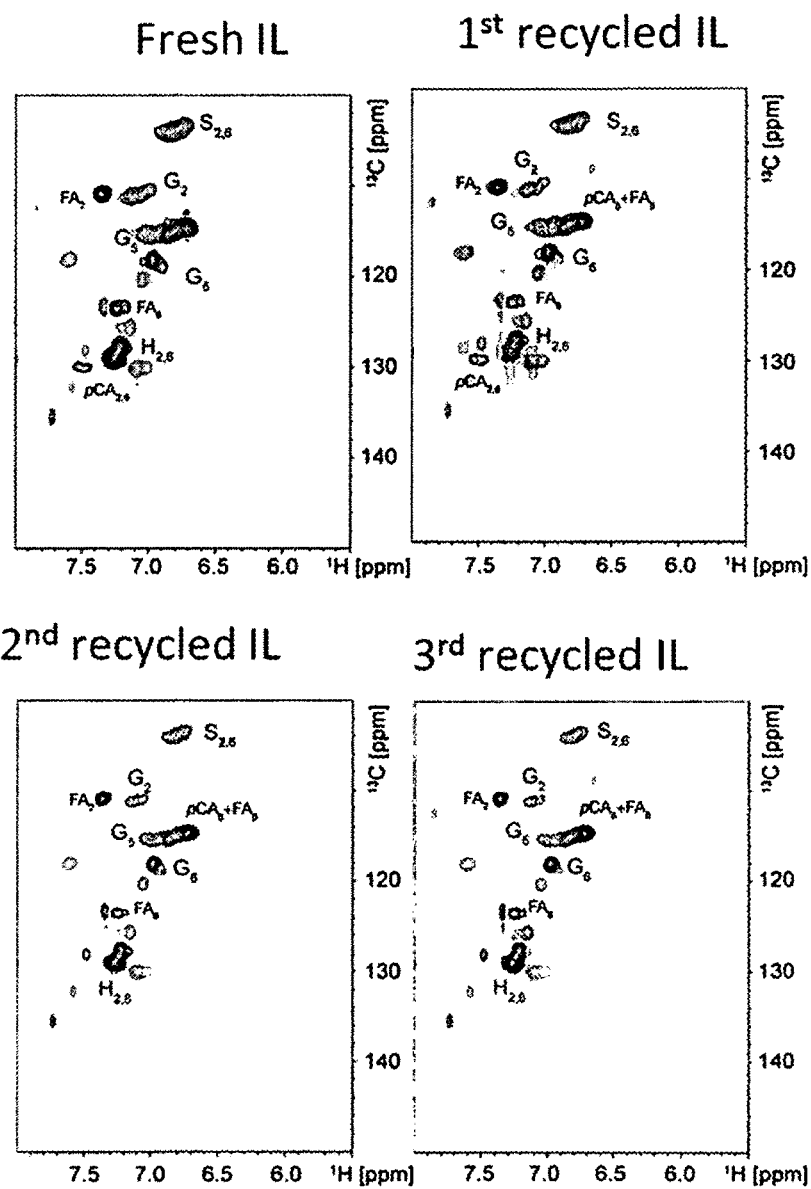
FIG. 12B shows the aromatic region of $^{13}$C-$^{1}$H HSQC NMR spectra of residual solids post enzymatic hydrolysis of IL-PSG by fresh IL and $1^{st}$, $2^{nd}$, and $3^{rd}$ recycled IL, indicating that lignin structural integrity is maintained in the residual solids.
Figure 12C:
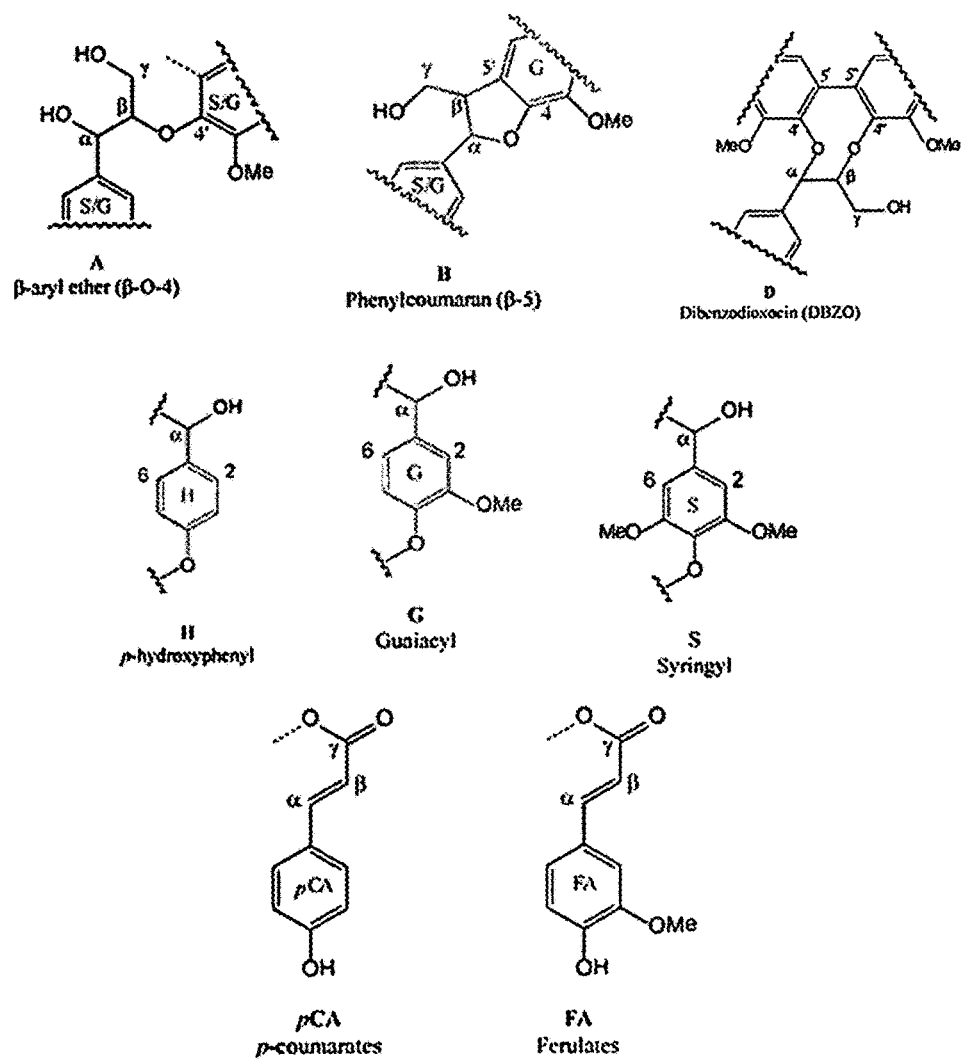
FIG. 12C shows the structural features giving rise to the $^{13}$C-$^{1}$H HSQC NMR signals.

Examination of the aromatic region (FIG. 9C-D) demonstrated that IL-PSG did not show any alteration in the signals for major aromatic units compared to that of intact SG except the disappearance of the FA$_\alpha$ and pCA$_\alpha$ after IL pretreatment. Ferulic acid (FA) and para-coumaric acid (pCA) are believed to bridge between lignin and carbohydrate units as lignin-carbohydrate complex (LCC) linkages. Hence, post enzymatic hydrolysis a part of FA and pCA might become labile in the enzymatic hydrolysis solution. These results suggest that while IL pretreatment could hydrolyze some lignin into smaller fragments, remaining lignin in IL-PSG samples have similar aromatic structures to lignin of intact SG. Similar results were observed on lignin post enzymatic hydrolysis from IL-PSG by 1$^{st}$ and 2$^{nd}$ recycled IL (FIG. 12), indicating a good efficiency of IL-octanol system.

One of the major challenges in a rapid commercialization of the IL-based lignocellulose pretreatment is the price of ionic liquids. Consequently, an efficient recycle of IL is required. The function of anti-solvents in cellulose solvent-based pretreatments is typically for regeneration of dissolved lignocellulose for subsequent enzymatic hydrolysis and fermentation. Most anti-solvents are polar and miscible with ionic liquids, making it hard to recycle ionic liquids.

The choice of different alkyl-chain lengths of alcohols as an anti-solvent did not affect enzymatic hydrolysis efficacies of IL-PSG, while it did affect lignin elution profiles. The IL-octanol system enabled high enzymatic glucan digestibilities at a low enzyme dosage, lignin fractionation, and recycle of IL. Recycled ILs from this system were shown to be effective at lignocellulose pretreatment and resulting IL-pretreated SG samples by recycled ILs showed similar chemical and structural characteristics to SG pretreated by fresh IL. Residual IL-pretreated SG solids post enzymatic hydrolysis consisted mainly of lignin and these resulting lignin was depolymerized as evidenced by an absence of dibenzodioxocins.

The invention has been described by way of illustration, and not by limitation. It is to be understood that the particular embodiments depicted in the figures and the terminology which has been used has been intended in a nature of words of description rather than of limitation. It is to be further understood that any combination of the solvents and compositions described in the foregoing paragraphs are deemed to be encompassed by the appended claims. It is to be further understood that all specific embodiments of the method of lignin extraction and biomass treatment are deemed to be encompassed by the appended claims. Many modifications and variations of the present invention are possible in light of the above teachings. It is therefore to be understood that the obvious modifications are deemed to be encompassed within the appended claims.

What is claimed is:

1. A composition containing monomeric guaiacol, 4-ethyl guaiacol, 4-vinyl guaiacol, eugenol, syringol, 4-(1-propenyl) guaiacol, vanillin, allyl syringol, and guaiacylacetone, wherein the composition is formed by:
   i) solubilizing a technical lignin in a solution comprising a water-miscible ionic liquid (IL) to generate a solubilized material;
   ii) precipitating a fraction of the solubilized material with a polar solvent to generate a precipitated fraction and a supernatant;
   iii) extracting the lignin compounds from the supernatant by contacting the supernatant with an extractant; and
   iv) separating the lignin compounds from the extractant;
   wherein the extractant is a non-polar solvent.

2. The composition of claim 1, wherein the ionic liquid is [C2mim][OAc].

3. The composition of claim 1, wherein the extractant is selected from the group consisting of benzene, pentane, and hexane.

4. The composition of claim 1, wherein the solubilizing is performed at a temperature between about 100° C. and about 180° C.

5. The composition of claim 1, wherein the polar solvent comprises water.

6. The composition of claim 1, wherein the technical lignin comprises kraft lignin, a lignosulfate, alkali lignin, low sulfonate alkali lignin, or a combination thereof.

7. A method comprising:
   i) contacting a technical lignin with an ionic liquid for at least about 3 hours to generate a solubilized material;
   ii) precipitating a fraction of the solubilized material with a polar solvent to generate a precipitated fraction and a supernatant;
   iii) extracting monomeric lignin compounds from the supernatant with an extractant; and
   iv) separating the lignin compounds from the extractant;
   wherein the monomeric lignin compounds are selected from the group consisting of guaiacol, 4-ethyl guaiacol, 4-vinyl guaiacol, eugenol, syringol, 4-(1-propenyl) guaiacol, vanillin, allyl syringol, guaiacylacetone, and combinations thereof, and
   wherein the extractant is a non-polar solvent.

8. The method of claim 7, wherein the ionic liquid is [C2mim][OAc].

9. The method of claim 7, wherein the contacting is performed at a temperature between about 100° C. and about 180° C.

10. The method of claim 7, wherein the polar solvent comprises water.

11. The method of claim 7, wherein the technical lignin comprises kraft lignin, a lignosulfate, alkali lignin, low sulfonate alkali lignin, or a combination thereof.

* * * * *